United States Patent [19]
Iwasaki et al.

[11] Patent Number: 5,991,125
[45] Date of Patent: Nov. 23, 1999

[54] MAGNETIC HEAD

[75] Inventors: Hitoshi Iwasaki, Yokosuka, Japan; Reiko Kondoh, Palo Alto, Calif.; Hiroaki Yoda, Kawasaki, Japan; Yuichi Ohsawa, Tokyo, Japan; Yuzo Kamiguchi, Yokohama, Japan; Susumu Hashimoto, Ebina, Japan

[73] Assignee: Kabushiki Kaisha Toshiba, Japan

[21] Appl. No.: 08/852,127

[22] Filed: May 6, 1997

Related U.S. Application Data

[62] Division of application No. 08/529,248, Sep. 15, 1995.

[30] Foreign Application Priority Data

Sep. 16, 1994 [JP] Japan ................................ P6-221412

[51] Int. Cl.$^6$ ....................................................... G11B 5/39
[52] U.S. Cl. ............................................................ 360/113
[58] Field of Search ............................. 360/113; 324/252; 365/8, 157, 158

[56] References Cited

U.S. PATENT DOCUMENTS

| | | | |
|---|---|---|---|
| 5,079,035 | 1/1992 | Krounbi et al. | 360/113 |
| 5,159,513 | 10/1992 | Dieny et al. | 360/113 |
| 5,206,590 | 4/1993 | Dieny et al. | 360/113 |
| 5,287,238 | 2/1994 | Baumgart et al. | 360/113 |
| 5,408,377 | 4/1995 | Gurney et al. | 360/113 |
| 5,422,571 | 6/1995 | Gurney et al. | 360/113 |
| 5,430,592 | 7/1995 | Toda | 360/113 |
| 5,436,778 | 7/1995 | Lin et al. | 360/113 |
| 5,442,508 | 8/1995 | Smith | 360/113 |
| 5,465,185 | 11/1995 | Heim et al. | 360/113 |
| 5,493,467 | 2/1996 | Cain et al. | 360/113 |
| 5,508,867 | 4/1996 | Cain et al. | 360/113 |

(List continued on next page.)

FOREIGN PATENT DOCUMENTS

| | | | |
|---|---|---|---|
| 1133213 | 5/1989 | Japan | 360/113 |
| 4-358310 | 12/1992 | Japan . | |
| 5-135332 | 6/1993 | Japan . | |
| 2016788 | 9/1979 | United Kingdom | 360/113 |

OTHER PUBLICATIONS

M.N. Baibich et al., "Giant Magnetoresistance of (001)Fe/(001)Cr Magnetic Superlattices," Physical Review Letters, 61(21):2472–2475 (1988).

S.S. Parkin et al., Oscillations in Exchange Coupling and Magnetoresistance in Metallic Superlattice Structures: Co/Ru, Co/Cr, and Fe/Cr, Physical Review Letters, 64(19):2304–2307 (1990).

B. Dieny et al., "Magnetotransport Properties of Magnetically Soft Spin–Valve Structures (invited)," J. Appl. Phys., 69(8):4774–4779 (1991).

R.P. Hunt, "A Magnetoresistive Readout Transducer," IEEE Transactions on Magnetics, MAG–7(1):150–154 (1971).

B. Dieny et al., "Giant Magnetoresistance of Magnetically Soft Sandwiches: Dependence on Temperature and on Layer Thickness," Physical Review B, 45(2):806–813 (1992).

C. Tsang et al., "Design, Fabrication & Testing of Spin–Valve Read Heads for High Density Recording," IEEE Trans. Mag., 30(6):3801–3806 (1994).

H. Yamamoto et al., "Magnetoresistance of Multilayers," Magnetics Society of Japan, 15(5):813–821 (1991).

*Primary Examiner*—David L. Ometz
*Attorney, Agent, or Firm*—Finnegan, Henderson, Farabow, Garrett & Dunner, L.L.P.

[57] ABSTRACT

A magnetoresistive head includes a magnetoresistive effect element including a magnetoresistive film, which has a first ferromagnetic layer and a second ferromagnetic layer separated by a nonmagnetic layer. A magnetization direction of the first ferromagnetic layer is perpendicular to a magnetization direction of the second ferromagnetic layer when a signal magnetic field is zero. A pair of bias layers provide magnetic bias, and a top surface of each of the pair of bias layers faces a lower surface of each edge region of the magnetoresistive film. A pair of lead electrodes produce a current flow through the magnetoresistive film, and each of the pair of lead electrodes is disposed on or above the magnetoresistive film.

5 Claims, 24 Drawing Sheets

U.S. PATENT DOCUMENTS

| | | | |
|---|---|---|---|
| 5,528,440 | 6/1996 | Fontana et al. | 360/113 |
| 5,549,978 | 8/1996 | Iwasaki et al. | 360/113 |
| 5,574,605 | 11/1996 | Baumgart et al. | 360/113 |
| 5,576,914 | 11/1996 | Rottmayer et al. | 360/113 |
| 5,583,725 | 12/1996 | Coffey et al. | 360/113 |
| 5,585,199 | 12/1996 | Kamiguchi et al. | 428/621 |
| 5,608,593 | 3/1997 | Kim et al. | 360/113 |
| 5,680,281 | 10/1997 | Kung et al. | 360/113 |
| 5,808,843 | 9/1998 | Kobayashi et al. | 260/113 |

MAGNETIC HEAD

This is a division of application Ser. No. 08/529,248 filed Sep. 15, 1995 (pending).

BACKGROUND OF THE INVENTION

1. Field of the Invention

The present invention relates to a magnetic head having a magnetoresistive film.

2. Description of the Related Art

As a well known method for reading a signal that has been recorded on a magnetic recording medium, a inductive-type read head is relatively moved against the recording medium and a voltage induced in the coil by the electromagnetic induction is detected. In addition, a magnetoresistive (MR) head using the phenomenon of which the electric resistance of a ferromagnetic substance varies corresponding to the intensity of an external magnetic field is also known as a high sensitivity head that detects a signal magnetic field of the recording medium (see IEEE MAG-7, 150, 1971). In recent years, as small-sized large-capacity magnetic recording units are required and the relative speed between the read head and the recording medium becomes small, the MR head that can output a large output signal regardless of the relative speed becomes important.

Conventionally, in the magnetoresistive head, an MR element portion whose resistance varies corresponding to the external magnetic field is composed of an alloy of Ni (80 atomic %) and Fe (20 atomic %) (this alloy is referred to as a permalloy) is used. The MR change ratio of the permalloy that has a good soft magnetic characteristic is at most around 3%. Thus, a material that has a higher MR change characteristic has been desired. In recent years, laminate films composed of a ferromagnetic metal layer and a non-magnetic metal layer such as Fe/Cr and Co/Cu that have giant MR change ratios (for example, 100% or more) have been reported (see Phys. Rev. Lett., Vol. 61, 2472, 1988 and Phys. Rev. Lett., Vol. 64, 2304, 1990). In addition, it has been reported that when the thickness of a non-magnetic layer is varied, the MR change ratio periodically varies because the magnetic coupling between an adjacent ferromagnetic metal layers changes periodically. In the case of the antiferromagnetic coupling state, the electric resistance of the laminate film is high because the direction of magnetization of an adjacent magnetic layers is opposite. In contrast in the case of the ferromagnetic coupling state, the electric resistance of the laminate is low because the direction of magnetization of an adjacent magnetic layer is the same. Thus, the magnetic layers are antiferromagnetically coupled when the external magnetic field is absent. Thereafter, an external magnetic field that exceeds the saturated magnetic field is applied to the laminate film. Thus, the laminate film is ferromagnetically coupled. Consequently, the magnetoresistance of the laminate film can be changed.

However, in the antiferromagnetic coupling state, since the coupling force is large, the saturated magnetic field becomes large. To solve such a problem, several methods to realize the antiparallel state of magnetization, without using the large antiferromagnetic coupling state, have been reported.

As a first example, using adjacent magnetic layers having different coercive forces, antiparallel state of magnetization is realized (see The Magnetics Society of Japan, Journal, Vol. 15, No. 5, 813, 1991). As a second example, an exchange bias of an antiferromagnetic layer is applied to one of two ferromagnetic layers with a non-magnetic interlayer so as to pin the magnetization of the layer. The other ferromagnetic layer (we call the rotatable magnetization layer) is reversely magnetized by the external magnetic field. Thus, antiparallel magnetization state is realized. Consequently, a large MR change is accomplished (see Phys. Rev. B., Vol. 45806, 1992 and J. Appl. Phys., Vol. 69, 4774, 1991). In particular, an element of which the direction of magnetization of the pinned magnetization layer is along perpendicular to an easy axis of magnetization of the rotatable magnetization layer (the soft magnetic layer whose magnetization rotates corresponding to the signal field) has been proposed on a spin valve type magnetic layer. In this element, it is not necessary to bias the operating point like a conventional MR element with a single magnetic layer, if the perpendicular magnetization alignment state is realized at a signal field=0 (as disclosed in Japanese Patent Laid-Open Publication No. 4-358310).

As described above, several MR elements using the theory of spin dependent scattering have been proposed. However, when these MR elements are formed in rectangular patterns for applying to magnetic heads, the achievement of perpendicular magnetization alignment state between the pinned magnetic layer and the rotatable magnetization layer is disturbed because of the magnetostatic coupling between the two magnetic layers. Thus, the operating point is largely shifted. Consequently, since the rotatable magnetization layer does not respond sharply to the signal magnetic field, a good linear characteristic to the signal magnetic field cannot be obtained, resulting in an output distortion.

SUMMARY OF THE INVENTION

The present invention is made from the above-described point of view. An object of the present invention is to provide a magnetic head having a spin valve type MR film of which the operating point is at the center of a resistance change, in other words the magnetizations of the two layers align perpendicular to each other at a signal field=0, so as to obtain a good linear characteristic to a signal magnetic field.

A first aspect of the present invention is a magnetic head, comprising a magnetic laminate including a pinned magnetization layer, a rotatable magnetization layer having an easy axis of magnetization in a head track width direction, and a non-magnetic layer disposed between the pinned magnetization layer and the rotatable magnetization layer, wherein the direction of magnetization of the pinned magnetization layer is inclined for less than 30° from a head depth direction toward the direction of magnetization of the rotatable magnetization layer so that the direction of magnetization of the pinned magnetization layer is along perpendicular to the direction of magnetization of the rotatable magnetization layer when a signal magnetic field is 0.

A second aspect of the present invention is a magnetic head, comprising a magnetic laminate including a pinned magnetization layer magnetized in a head depth direction, a rotatable magnetization, and a non-magnetic layer disposed between the pinned magnetization layer and the rotatable magnetization layer, wherein the direction of the easy axis of magnetization of the rotatable magnetization layer is inclined for less than 30° from the direction of the head track width to the direction of magnetization of the pinned magnetization layer so that the direction of magnetization of the pinned magnetization layer is along perpendicular to the direction of magnetization of the rotatable magnetization layer when a signal magnetic field is 0.

A third aspect of the present invention is a magnetic head, comprising a magnetic laminate including a pinned magnetization layer magnetized in a head depth direction, a rotatable magnetization layer having an easy axis of magnetization in a head track width direction, and a non-magnetic layer disposed between the pinned magnetization layer and the rotatable magnetization layer, wherein the relation of $v_2/V_1 \geq 3$ is satisfied, where $V_1$ is the product of the saturated magnetization of the pinned magnetization layer and the volume thereof, and $V_2$ is the product of the saturated magnetization of the rotatable magnetization layer and the volume thereof.

A fourth aspect of the present invention is a magnetic head, comprising a magnetic laminate including a pinned magnetization layer magnetized in a head depth direction, a rotatable magnetization layer having an easy axis of magnetization in a head track width direction, and a non-magnetic layer disposed between the pinned magnetization layer and the rotatable magnetization layer, wherein a magnetic layer is disposed on or under the magnetic laminate, wherein the magnetic layer is magnetostatistically coupled to the pinned magnetization layer so that the direction of magnetization of the magnetic layer moves toward the opposite direction to the direction of magnetization of the pinned magnetization layer.

A fifth aspect of the present invention is a magnetic head, comprising a magnetoresistive element using a spin dependent scattering, including a rotatable magnetization film whose magnetization is rotated by a signal magnetic field formed on a ferromagnetic underlayer film, the direction of magnetization of the signal magnetic field being along in a track width longitudinal direction when the signal magnetic field is almost 0, a pinned magnetization film whose magnetization is not substantially moved in the signal magnetic field, the direction of magnetization of the pinned magnetization film being pinned almost to the head depth direction, and a non-magnetic film disposed between the rotatable magnetization film and the pinned magnetization film, a pair of bias magnetic films (hard magnetic films or the like) disposed just below the surface of the ferromagnetic underlayer film at positions apart from the portion of which the magnetization is rotated corresponding to the signal magnetic field of a recording track, and an electrode for supplying a sense current to the magentoresistive film.

Next, the magnetic heads of the first to fifth aspects of the present invention will be described in detail.

Each of the magnetic heads according to the present invention is composed of a laminate of a rotatable magnetization layer, a non-magnetic layer, and a pinned magnetization layer. The thickness of the rotatable magnetization layer is preferably in the range from 0.5 to 20 nm. The thickness of the non-magnetic layer is preferably in the range from 0.5 to 10 nm. The thickness of the pinned magnetization layer is preferably in the range from 0.5 to 20 nm. It should be noted that each magnetic head according to the present invention can be composed of a plurality of laminates. In addition, each layer of the laminate can be composed of a plurality of sub-layers.

When a MR element is formed in a rectangular pattern for applying to a magnetic head, the perpendicular magnetization alignment of two film layers of the pinned magnetization layer and the rotatable magnetization layer cannot be maintained due to the magnetostatic coupling between the two magnetic layers. Thus, the operating point is shifted. Next, this phenomenon will be described.

As energy applied for the two magnetic film layers, anisotropic energy, magnetostatic energy, interlayer exchange coupling energy, self demagnetizing energy, and interlayer magnetostatic coupling energy are considered. It is assumed that the first layer of the two-layer film is denoted by $M_1$ and the other is denoted by $M_2$, the angle of the direction of magnetization of $M_1$ to the longitudinal direction of the rectangular pattern is $\theta_1$ and the angle of the direction of magnetization of $M_2$ to the longitudinal direction of the rectangular shape is $\theta_2$, and the direction of the easy axis of magnetization of $M_2$ is as shown in FIG. 1. The longitudinal direction of the rectangular pattern represents the direction of head track width. In addition, it is assumed that the magnetization of $M_1$, is pinned, not moved (namely, $\theta_1=90°$). The thicknesses of the two films $M_1$ and $M_2$ are $t_1$ and $t_2$, respectively. When the sum of these types of energy is minimized, the angle $\theta_2$ of magnetization of the non-pinned magnetization layer ($M_2$) can be expressed by the following equation (1).

$$\theta_2 = \sin^{-1} \frac{(H_{ex} + H_{in} - H_{d1}) \cdot t_2 - H_{d2} \cdot t_1}{2(H_{d2} \cdot t_2 + 2K_u/M_s \cdot t_2)} \quad (1)$$

where $H_{ex}$ is the applied magnetic field; $H_{in}$ is the interlayer exchange coupling magnetic field; $Hd_1$ is the demagnetizing field of the pinned magnetization layer; $Hd_2$ is the demagnetizing field of the rotatable magnetization layer; Ku is the anisotropic energy of the rotatable magnetization layer; and Ms is the saturated magnetization of the rotatable magnetization layer.

The resistance R of the giant MR effect can be expressed by the following equation (2).

$$R=R_0-\Delta R/2 \cdot \cos(\pi/2-\theta_2) \quad (2)$$

where $R_0$ is the resistance in the case that the direction of magnetization of $M_1$ is perpendicular to the direction of magnetization of $M_2$; and $\Delta R$ is the maximum resistance change. In this case, it is assumed that the direction of magnetization of the pinned magnetization layer (a ferromagnetic layer whose magnetization is pinned by an antiferromagnetic layer like FeMn or a high coercive force layer) is not moved.

FIG. 2 shows the $H_{ex}$ dependency of R of which the equation (1) is substituted into the equation (2). When the element is formed in a regular rectangular pattern, the value of ($H_{in}$–$Hd_1$) is negative. Thus, as shown in FIG. 2, the operating point of the R-H curve is shifted. This is because when $H_{ex}$=0, $\theta_2$ deviates from 0 (namely, the perpendicular relation of the direction of magnetization of the pinned magnetization layer and the direction of magnetization of the rotatable magnetization layer is lost). When the element is formed in a rectangular pattern with an area of 3×80 μm and the thickness thereof is 5 nm, since $H_{in}$ is 400 A/m and $Hd_1$ is 2000 A/m, $H_{in}$–$Hd_1$=–1600 A/m.

Thus, each of the magnetic heads according to the present invention has a spin valve MR element that suppresses the operating point from being shifted due to the magnetostatic coupling or that causes the direction of magnetization of a pinned magnetization layer and the direction of magnetization of a rotatable magnetization layer to be perpendicular (namely, $\theta_2$=0) in the magnetostatic coupling or energy stable state of such as demagnetizing field.

The head depth direction of the present invention means the width direction of the spin valve element pattern, namely the entering direction of the signal magnetic field. In FIG. 4A, the head depth direction is denoted by an arrow X and the head track width direction is denoted by an arrow Y.

Omitting the magnetostatic coupling of the pinned magnetization layer, the magnetization state in the case that the direction of magnetization of the pinned magnetization layer is inclined can be simply expressed by the following equation.

The resistivity ρ of the giant magnetoresistive effect can be expressed by the following equation (3).

$$\rho = \rho_0 - \Delta\rho/2 \cdot \cos(\theta_1 - \theta_2) \tag{3}$$

where $\rho_0$ is the resistivity in the case that the direction of magnetization of the pinned magnetization layer is perpendicular to that of the rotatable magnetization layer; $\Delta\rho$ is the maximum resistivity change; $\theta_1$ is the angle of magnetization of the pinned magnetization layer (a ferromagnetic layer whose magnetization is pinned by an antiferromagnetic layer or a high coercive force layer); and $\theta_2$ is the angle of magnetization of a soft magnetic layer. In this case, the relation between the two layers is as shown in FIG. 1.

In addition, the magnetization of the soft magnetic layer is uniformly rotated. At this point, the magnetization of $M_2$ can be expressed by the following equation (4).

$$\sin \theta 2 = H/Hk \tag{4}$$

where Hk is an anisotropic magnetic field that includes an demagnetizing field or the like corresponding to the anisotropy and shape of the film.

Thus, the resistivity change ratio ρ' can be expressed by the following equation (5).

$$\rho' = -\Delta\rho/2((1-(H/Hk)^2)^{1/2} \cos \theta_1 + H/Hk \cdot \sin \cdot \theta_1 \tag{5}$$

From this equation, the change of ρ' by H at $\theta_1$ (the inclination of the pinned magnetization layer) is shown in FIG. 3 (in this case, Hk including an demagnetizing field is around 6000 A/m). From FIG. 3, it is clear that when the direction of magnetization of the pinned magnetization layer is properly inclined, the perpendicular magnetizing condition of the pinned magnetization layer and the rotatable magnetization layer (where the resistivity change ratio is 0 in FIG. 3) is shifted to the positive magnetic field side (the high resistance side). Thus, the perpendicular magnetizing condition that has been shifted to the negative magnetizing side due to the magnetostatic coupling by the pinned magnetization layer shown in FIG. 2 can be restored to the position of which applied magnetic field=0. Thus, high sensitivity by the giant magnetoresistive effect and good linear characteristic to the signal magnetic field can be accomplished.

In addition, the same effect can be accomplished by inclining the direction of magnetization of the rotatable magnetization layer for less than 30° from the head track width direction to the direction of magnetization of the pinned magnetization layer as the magnetic head of the second aspect of the present invention. In the present invention, the pinned magnetization layer is preferably exchanged-biased by an antiferromagnetic layer. The pinned magnetization layer may be a high coercive force layer, or a laminate film of a high coercive force layer and a ferromagnetic layer. The pinned magnetization layer is preferably magnetized by annealing at a temperature above the blocking temperature of the antiferromagnetic layer (for example: 150–200° C. for FeMn film) in a static magnetic field.

The third aspect of the present invention will be described below.

Assuming that the product of the saturated magnetization of a pinned magnetization layer and the volume thereof is $V_1$ and the product of the saturated magnetization of a rotatable magnetization layer and the volume thereof is $V_2$, when the relation of $V_2/V_1 \geq 3$ is satisfied, the shifting of the operating point can be controlled.

Next, the reason will be described.

In the equation (1), in the case that the applied magnetic field is 0 (namely, $H_{ex}$ is almost 0) or in the case that the interlayer exchange coupling magnetic field can be ignored (namely, $H_{in}$ is almost 0), and in the case that the induced magnetic anisotropic energy (namely, the anisotropic magnetic field (2Ku/Ms)) is around 800 A/m, in order to realize $0 \leq \theta_2 \leq 30°$, the relation of $t_2/t_1 \geq 3$ should be satisfied. In spin valve MR elements, the patterned surface shape of the pinned magnetization layer is generally the same as that of the rotatable magnetization layer. Thus, assuming that the thickness of the pinned magnetization layer is denoted by $t_1$ and the thickness of the rotatable magnetization film is denoted by $t_2$, they can be substituted with the volume of the pinned magnetization layer and the volume of the rotatable magnetization layer. To obtain a preferable range of $\theta_2$, the range of the ratio of $V_2/V_1$ is preferably 3.5 or more. Furthermore, the $V_2/V_1 \geq 3$ can be achived by increasing $t_2$ by means that a soft magnetic layer is formed under the rotatable magnetization layer with exchange coupling. By using a high resistance film (made of for example a Co based amorphous alloy and a NiFeCr alloy) as the soft magnetic film, even if the thickness of the free layer increases, the decrease of ΔR/R can be suppressed and thereby a signal can be reproduced with a high sensitivity.

In the magnetic head of the third aspect of the present invention, when the pinned magnetization layer is exchange-biased by an antiferromagnetic layer and a ferromagnetic layer, $V_1$ is expressed by the product of the saturated magnetization of the ferromagnetic layer whose magnetization is pinned by the antiferromagnetic layer and the volume thereof. When the pinned magnetization layer is a laminate film of a high coercive force layer and a ferromagnetic layer, $V_1$ is expressed by the product of the sum of magnetization of the ferromagnetic layer whose magnetization is pinned by the high coercive force layer and magnetization of the high coercive force layer and the volume thereof.

To control the shifting of the operating point, the thickness of the ferromagnetic layer of which the direction of magnetization is pinned and the thickness of the rotatable magnetization layer are varied. In addition, to do that, the direction of magnetization of the pinned magnetization layer is inclined. These methods can be independently performed. When these methods are used in a combination, better effects can be obtained.

In the magnetic head of the fourth aspect of the present invention, another magnetic layer is disposed on the pinned magnetization layer or under the rotatable magnetization layer preferably through a non-magnetic layer. When the direction of magnetization of the magnetic layer moves toward the antiparallel direction of magnetization of the pinned magnetization layer, the direction of magnetization of the pinned magnetization layer can be along almost perpendicular to the direction of magnetization of the rotatable magnetization layer when the intensity of the signal magnetic field is almost zero. Thus, the operating point can be properly shifted. This is because the magnetostatic coupling of the pinned magnetization layer and the rotatable magnetization layer weakens due to the magnetostatic coupling of the pinned magnetization layer and the magnetic layer (namely, the leakage magnetic field of the pinned magnetization layer is absorbed by the other magnetic layer). The other magnetic layer may be a hard magnetic film that is magnetized in the opposite direction of the magnetization of the pinned magnetization layer. Alternatively, the other magnetic layer may be a soft film (such as an amorphous Co based film) of which the direction of magnetization is easily varied due to the leakage magnetic field of the pinned magnetization layer. To suppress the shunts sense current to the other magnetic film (if the sense current shunts, the resistance change ratio decreases), the resistance of the other magnetic layer is preferably as high as possible.

In the constructions of the magnetic heads of the first to fourth aspects of the present invention, the direction of magnetization of the pinned magnetization layer can be along almost perpendicular to the direction of magnetization of the rotatable magnetization layer.

In these constructions, when the magnetoresistive element is patterned finely, the shifting of the operating point can be reduced. In addition, the operating point can be maintained to the center of the resistance change. Thus, the wide-range resistance change can be obtained, and the good linear characteristic to the signal magnetic field can be obtained. Consequently, magnetic heads with excellent sensitivity and excellent high frequency characteristic can be produced.

A fifth aspect of the present invention is a magnetic head, comprising a magnetoresistive element using a spin dependent scattering, including a rotatable magnetization film whose magnetization is rotated by a signal magnetic field formed on a ferromagnetic underlayer film, the direction of magnetization of the signal magnetic field being along in a track width longitudinal direction when the signal magnetic film is almost 0, a pinned magnetization film whose magnetization is not substantially moved in the signal magnetic field, the direction of magnetization of the pinned magnetization film being pinned almost to the entering direction of the signal magnetic field, and a non-magnetic film disposed between the rotatable magnetization film and the pinned magnetization film, a pair of bias films (hard magnetic films or the like) disposed just below the surface of the ferromagnetic underlayer film at positions apart from the portion of which the magnetization is rotated corresponding to the signal magnetic field of a recording track, and an electrode for supplying a sense current to the magnetoresistive film.

In a conventional MR head, a longitudinal bias magnetic field is applied to the rotatable magnetization layer by hard magnetic films adjacently disposed on both edges of the spin valve film so as to suppress Barkhausen noise. To accomplish this construction (for example, U.S. Pat. No. 5,079,035), since the hard magnetic films are lift-off formed with a resist that is used for patterning the spin valve film by Ar ion milling process, the hard magnetic film adhered at the resist taper portion tend to remain at the edge portion of the spin valve. Thus, an insulation failure between the shield and the spin valve will take place. Consequently, it is difficult to form a narrow gap that is necessary for increasing the linear recording density. In addition, since the leakage magnetic field of the hard magnetic films adversely affects the spin valve, when the track width is 2 μm or less, the sensitivity deteriorates.

On the other hand, according to the present invention, after the hard magnetic films are patterned by the conventional film forming process, photolithography process, and etching process, resist removing process, the spin valve can be patterned by the conventional film forming process, photolithography process, etching process, and resist removing process. Thus, such an insulation failure does not take place. When the distance between the hard magnetic films is widened in comparison with the distance between a pair of electrodes that defines the read track width, the leakage magnetic field of the hard magnetic films flows to the shield film rather than the magnetic sensing portion (between the electrodes) of the spin valve portion. Thus, the sensitivity of the narrow track reproduction can be prevented from deteriorating.

Practically, in the case that the thickness of the gap film is 0.15 μm or less, when the distance of the hard magnetic films is larger than the distance of the electrodes by 1 μm or more, the deterioration of the sensitivity due to the leakage magnetic field of the hard magnetic films can be remarkably reduced even if the distance of the electrodes is as narrow as 1 μm.

In the conventional MR head using the anisotropic magnetoresistive effect, when the distance of hard magnetic films is larger than the distance of electrodes, a cross talk from an adjacent side track takes place. However, when the direction of magnetization of the rotatable magnetization layer is along perpendicular to the direction of magnetization of the medium magnetic field (the track width direction), the shifting of the operating point and the cross talk can be prevented. In the conventional spin valve film, since a non-magnetic underlayer material composed of for example Ta is used, it prevents the magnetic coupling of the hard magnetic films and the rotatable magnetization film. Thus, the Barkhausen noise cannot be properly suppressed. However, according to the present invention, since the spin valve film uses the ferromagnetic underlayer material, such problems do not take place.

The ferromagnetic underlayer film is preferably a magnetic laminate of a Co based amorphous film and a magnetic film with the crystal structure of face centered cubic (fcc) such as NiFe or NiFeCr. The Co based amorphous film contributes to the growth without surface roughness of a metal film disposed on it. The fcc magnetic film promotes the fcc (111) orientation. Thus, a large resistance change ratio due to the smooth surface and the soft magnetization due to the fcc (111) orientation can be accomplished.

In addition, an Co based alloy used for the rotatable magnetization film, Cu used for the non-magnetic film, Co or Co based alloy used for the pinned magnetization film, and a FeMn antiferromagnetic bias film used for pinning the magnetization of the pinned magnetization film do not have satisfactory corrosive resistances, part or all of the rotatable magnetization film, the non-magnetic film, and the pinned magnetization film including the bias film are preferably recessed from the opposite surface of the medium in comparison with the magnetic underlayer film and hard magnetic films so that they are not directly exposed to the outside in the slider machining process. In the recess construction, since the longitudinal bias film is formed in the vicinity of the opposite surface of the medium as well as the magnetic underlayer film, the Barkhausen noise from the rotatable magnetization layer of the spin valve film and the magnetic underlayer film can be suppressed.

These and other objects, features and advantages of the present invention will become more apparent in light of the following detailed description of best mode embodiments thereof, as illustrated in the accompanying drawings.

DESCRIPTION OF THE PREFERRED EMBODIMENTS

Next, with reference to the accompanying drawings, embodiments of the present invention will be described.

First Embodiment

In the first embodiment, the thickness of a ferromagnetic layer having a pinned magnetization layer is different from the thickness of a rotatable magnetization layer.

Figure 4A:
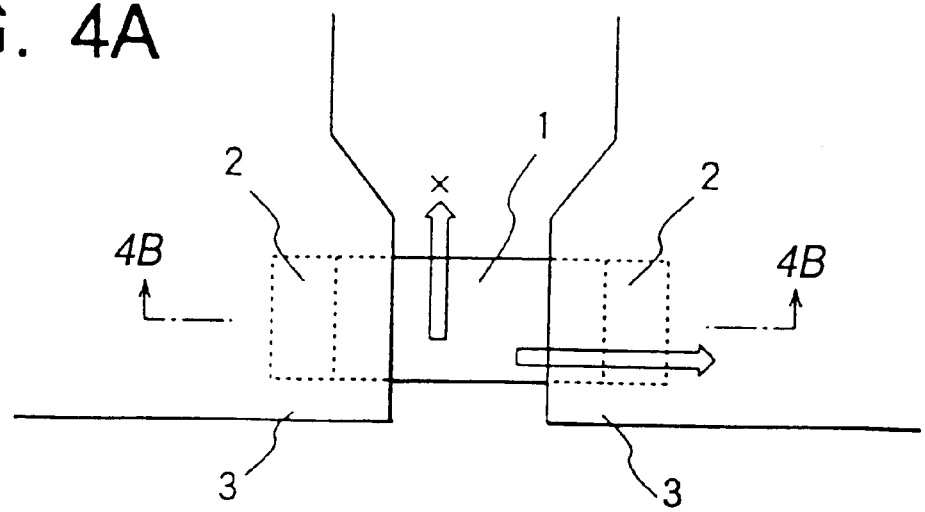
FIG. 4A is a plan view showing the construction of a magnetic head according to a first embodiment of the present invention.
Figure 4B:
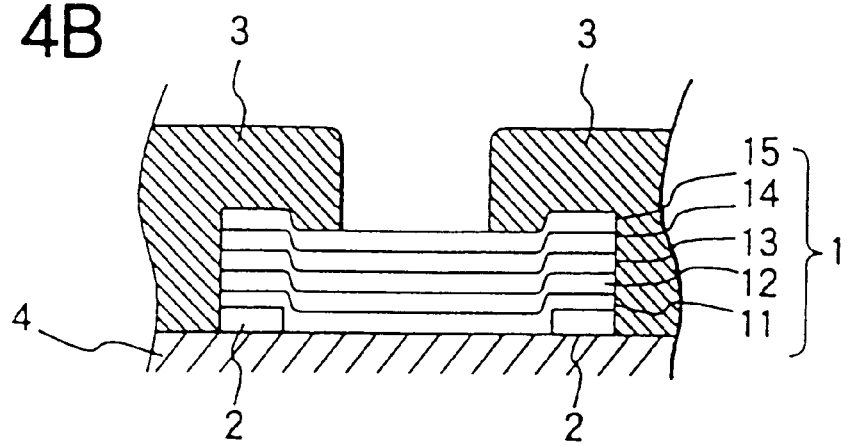
FIG. 4B is a sectional view showing the construction of the magnetic head according to the first embodiment of the present invention.
Figure 5:
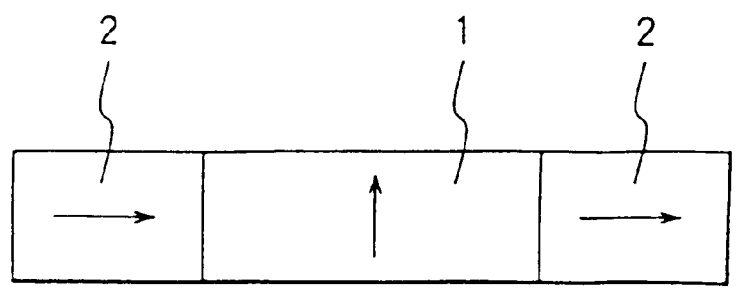
FIG. 5 is a schematic diagram showing the directions of magnetization according to the first embodiment.

A spin valve type MR element with an area of 100 $\mu$m ×5 $\mu$m having high coercive force layers 2 at edge portions is disposed on a substrate 4 and formed in a rectangular shape. Thereafter, electrodes 3 composed of Cu are formed with a thickness of 200 nm on the resultant structure. FIG. 4A is a plan view showing the first embodiment. FIG. 4B is a sectional view taken along line 4B—4B of FIG. 4A. A spin valve laminate film 1 is constructed of a lower ferromagnetic layer (CoFe) 11 with a thickness of 15 nm, an intermediate layer (Cu) 12 with a thickness of 3 nm, an upper ferromagnetic layer (CoFe) 13 with a thickness of 5 nm, an antiferromagnetic layer (FeMn) 14 with a thickness of 8 nm, and a protection layer (Ti) 15 with a thickness of 10 nm. The high coercive force layer 2 is composed of CoPt with a thickness of around 40 mn. The spin valve laminate film 1 and the high coercive force layers 2 are magnetized in the directions as shown in FIG. 5. In this case, the relation of $V_2/V_1=3$ is satisfied.

Figure 6:
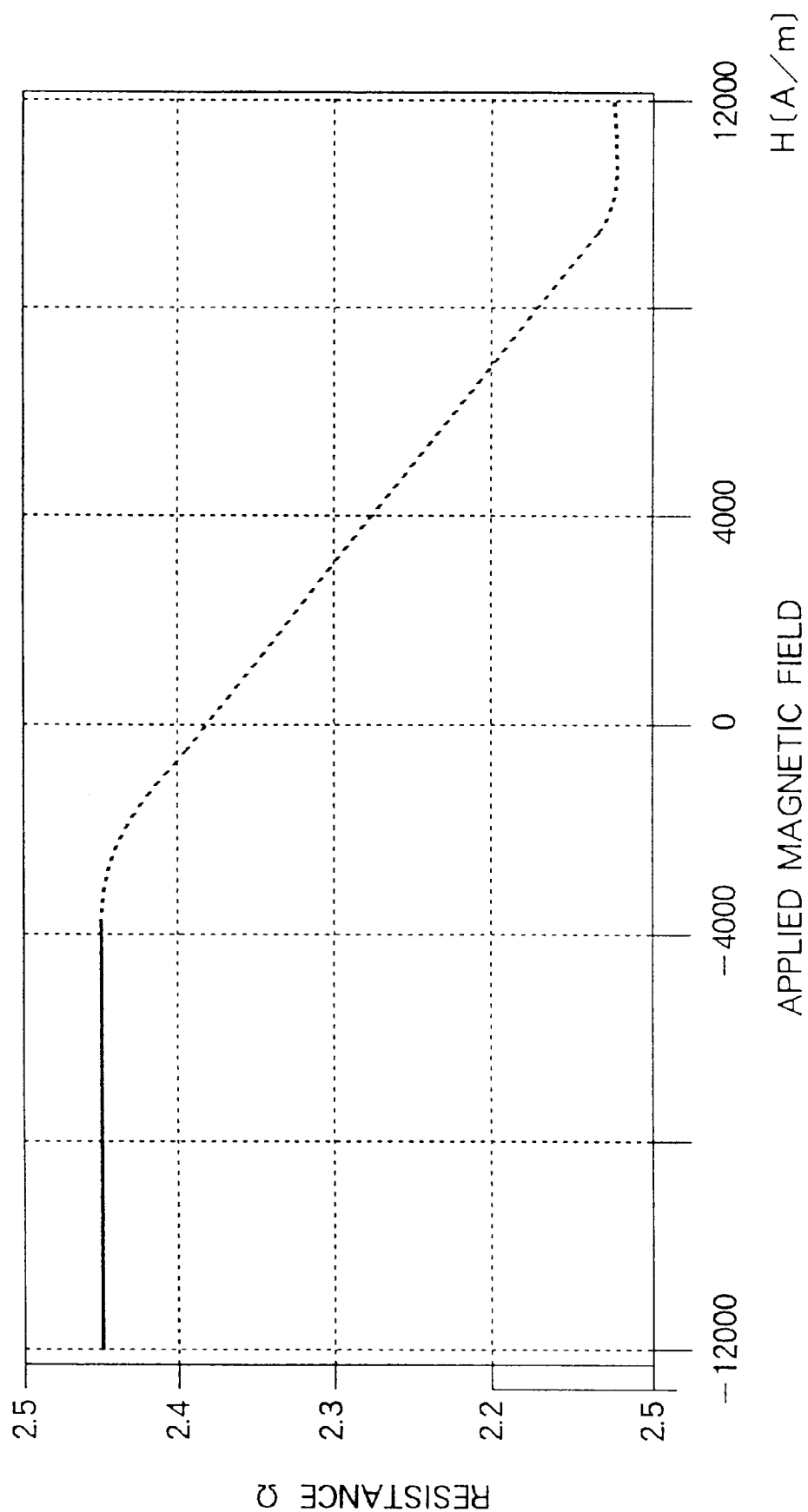
FIG. 6 is a graph showing the relation between an applied magnetic field of the magnetic head and the resistance of the magnetic head according to the first embodiment (hereinafter, the curve of FIG. 6 is referred to as an R-H curve)

FIG. 6 is a graph showing a resistance v.s. applied magnetic field curve (hereinafter referred to as an R-H curve) of the magnetic head according to the first embodiment of the present invention. The shifting of the operating point of the magnetic head according to the first embodiment is remarkably reduced in comparison with a first comparison example that will be described later (see FIG. 9). Thus, even if a negative signal magnetic field is applied to the magnetic head of this embodiment, a resistance change is larger than that of the first comparison example shown in FIG. 9.

In the present invention, the material of the intermediate layer 12 is for example Au, Ag, or an alloy that mainly contains Cu Au or Ag as well as Cu. The material of the antiferromagnetic layer 14 is an antiferromagnetic alloy such as NiMn, CoMn, PtMn, IrMn, or PdMn as well as FeMn.

The material of the protection layer 15 is for example W, V, Hf, Zr, Mo, Cr, Nb, or Ta as well as Ti. Nitrogen may be added to the protection layer 15 in order to increase the resistance of the protection layer 15.

The material of the rotatable magnetization layer and the pinned magnetization layer is composed of a ferromagnetic substance containing Co, Fe, Ni, or the like, preferably, a Co alloy such as $Co_{1-x}Fe_x$ (where $0 < x \geq 0.4$ at). In addition, this material may contain Pd, Cu, Au, Ag, Ir, Rh, or the like as an incorporated component.

Second Embodiment

In the second embodiment, the thickness of the ferromagnetic layer having the pinned magnetization layer is different from the thickness of the rotatable magnetization layer. In addition, in the second embodiment, the direction of magnetization of the pinned magnetization layer is inclined.

Figure 7:
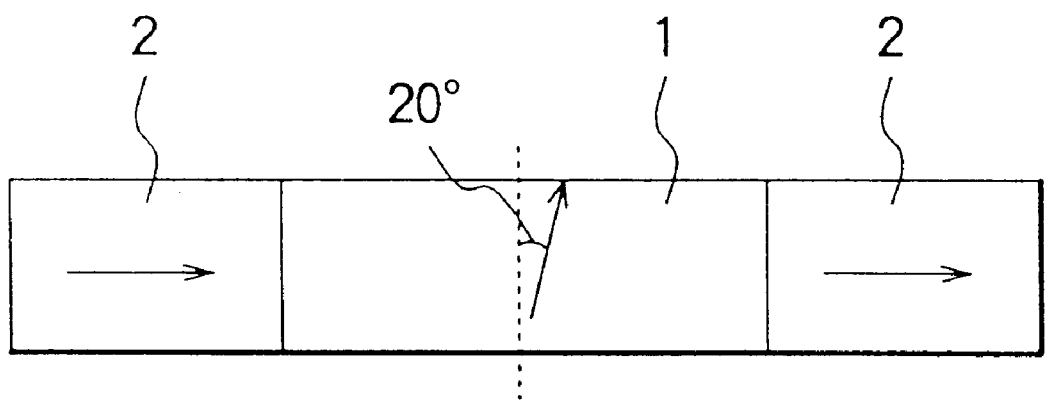
FIG. 7 is a schematic diagram showing the direction of magnetization according to a second embodiment of the present invention.

As shown in FIG. 7, a magnetic head with the same construction as the first embodiment is obtained except that the direction of magnetization of the pinned magnetization layer 13 is inclined toward the direction of magnetization of the high coercive force layer 2 for 20° is obtained.

Figure 8:
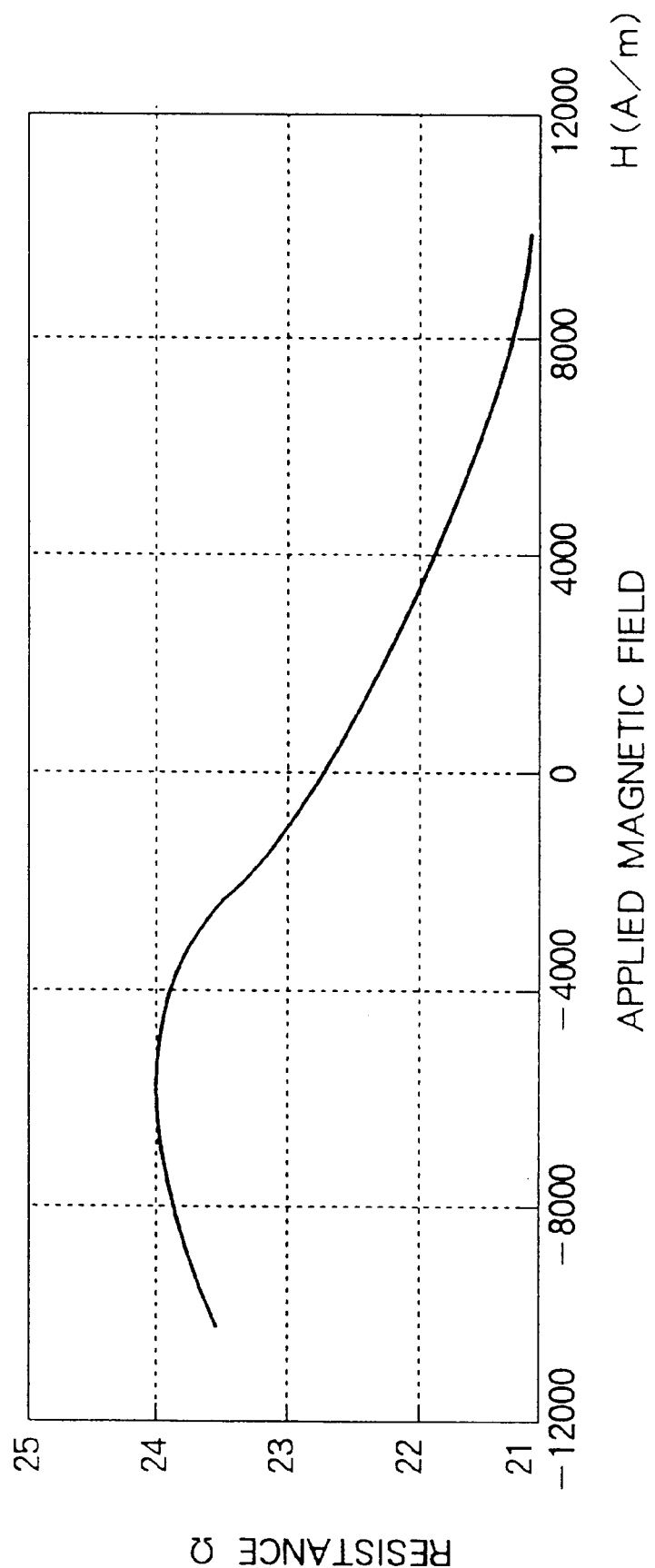
FIG. 8 is a graph showing an R-H curve of the magnetic head according to the second embodiment.

FIG. 8 is a graph showing an R-H curve of the magnetic head according to the second embodiment. The shifting of the operating point is remarkably reduced in comparison with the first embodiment (FIG. 6). Thus, even if a strong negative signal magnetic field is applied to the magnetic head, a high resistance change ratio that is a feature of the giant magnetoresistive effect can be satisfactorily used. Consequently, the output signal of the magnetic head is free from distortion.

Third Embodiment

In the third embodiment, the direction of magnetization of the pinned magnetization layer is inclined.

A magnetic head with the same construction as the second embodiment except that the thickness of the lower ferromagnetic layer (CoFe) 11 is 5 nm is obtained.

The shifting of the operating point on the R-H curve of the obtained magnetic head is almost in the middle of those of the first embodiment and the second embodiment.

First Comparison Example

A magnetic head with the same construction as the first embodiment except that the thickness of the lower ferromagnetic layer (CoFe) 11 is 5 nm is obtained.

Figure 9:
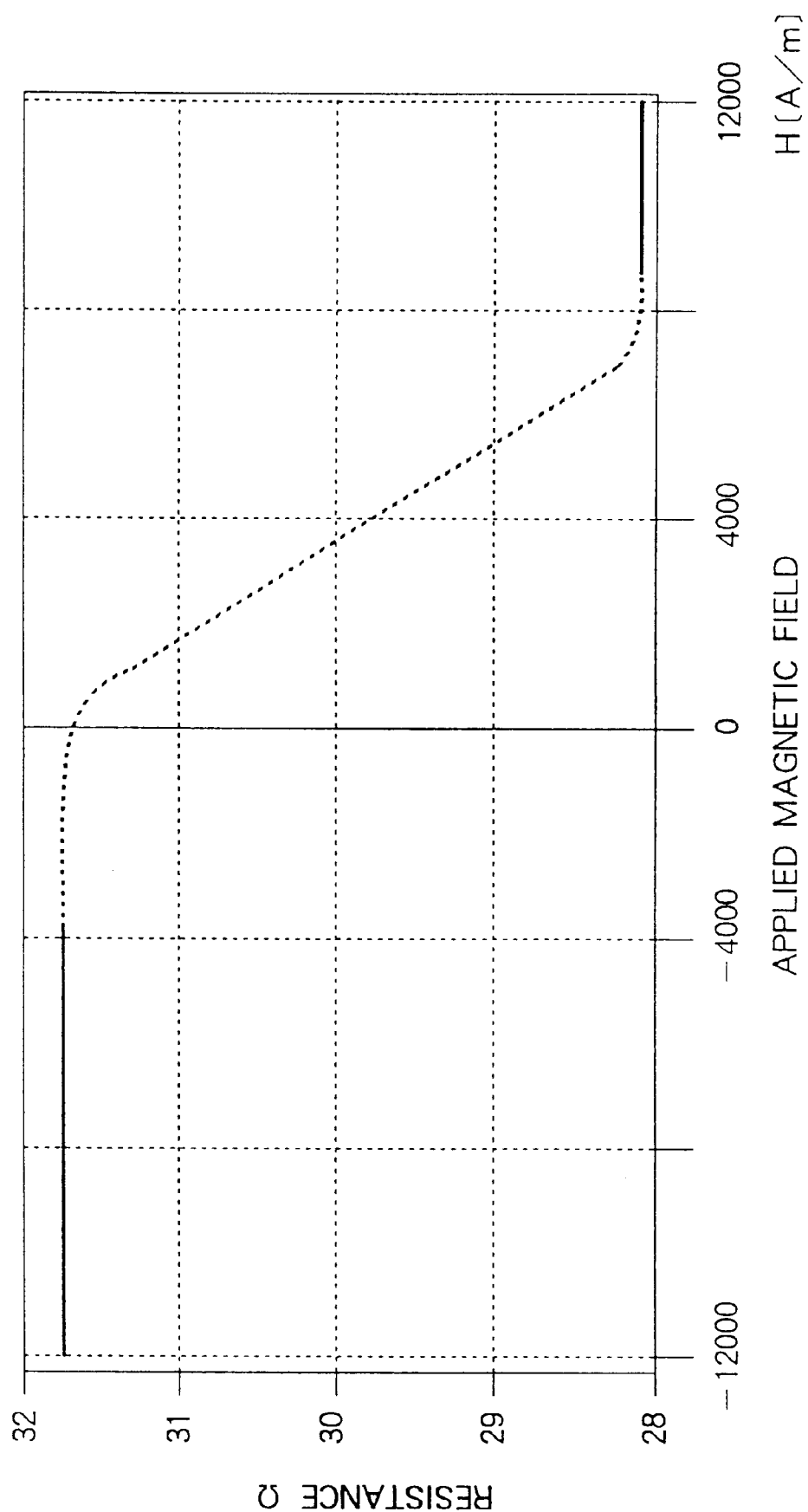
FIG. 9 is a graph showing an R-H curve of the magnetic head corresponding to a first comparison example.

FIG. 9 is a graph showing an R-H curve of the magnetic head according to the first comparison example. As shown in FIG. 9, the shifting of the operating point is large. When the applied magnetic field (H) is 0, the maximum resistance is obtained (namely, the direction of magnetization of the rotatable magnetization layer is along in antiparallel to the direction of the pinned magnetization layer). Therefore, when a negative signal magnetic field is applied, the resistance does not almost change. Thus, when the thickness of the ferromagnetic layer (in this example, the upper ferromagnetic layer) whose magnetization is pinned (in this example, the upper ferromagnetic layer) is equal to the thickness of the rotatable magnetization layer (in this example, the lower ferromagnetic layer) and when the direction of magnetization of the pinned magnetization layer is not inclined, the R-H curve is largely shifted.

Second Comparison Example

Figure 10:
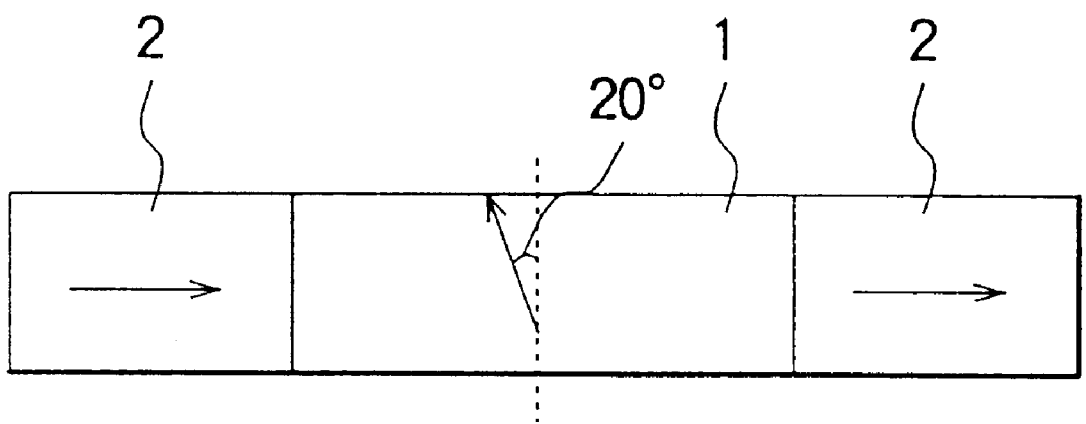
FIG. 10 is a schematic diagram showing the directions of magnetization according to a second comparison example.

A magnetic head with the same construction as the second embodiment except that the direction of magnetization of the pinned magnetizatin layer is inclined in the opposite direction of magnetization of the high coercive force layer 2 for 20° as shown in FIG. 10 is obtained.

Figure 11:
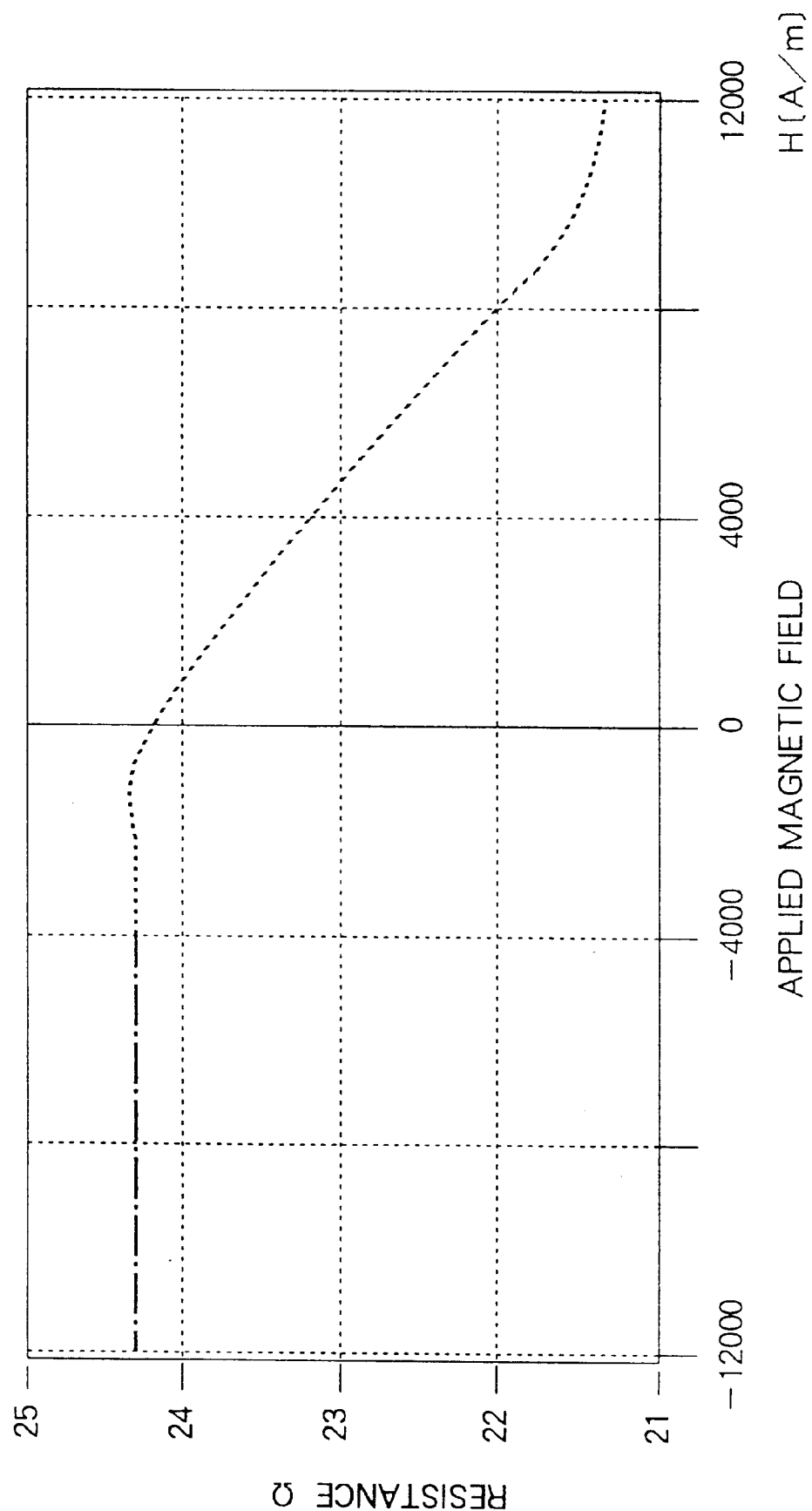
FIG. 11 is a graph showing an R-H curve of the magnetic head according to the second comparison example.

FIG. 11 is a graph showing an R-H curve of the magnetic head according to the second comparison example. As shown in FIG. 11, the R-H curve of the second comparison example is more shifted than that of the second embodiment (shown in FIG. 8). When the magnetic field is 0, the direction of magnetization of the first ferromagnetic layer is along in antiparallel with that of the second ferromagnetic layer. When a negative signal magnetic field is applied, the magnetization does not vary. In addition, the linearity of the R-H curve is distorted.

The inclined angle of the direction of magnetization of the pinned magnetization layer and the thickness ratio of each ferromagnetic layer depend on the shape of the element, the saturated magnetization amount of each magnetic layer, anisotropic magnetic field, and so forth. In the case that the inclined angle of the direction of magnetization of the pinned magnetization layer is less than 30°, assuming that the thicknesses of the pinned magnetization layer and the rotatable magnetization layer are denoted by $t_1$ and $t_2$, and the saturated magnetization amounts thereof are denoted by $M_1$ and $M_2$, when the relation of $t2 \cdot M2/t1 \cdot M1 \geq 3$ is satisfied, the shifting of the R-H curve can be remarkably reduced. Thus, the high resistance change ratio can be satisfactorily used.

Fourth Embodiment

A magnetic head with the same construction as the first embodiment except that the lower ferromagnetic layer 11 is a laminate film of CoFe (with a thickness of 5 nm) and CoZrNb (with a thickness of 3 nm) and the thickness of the upper ferromagnetic layer (CoFe) is 3 nm is obtained. In this case, $V_2/V_{1b} = 3.1$.

Figure 12:
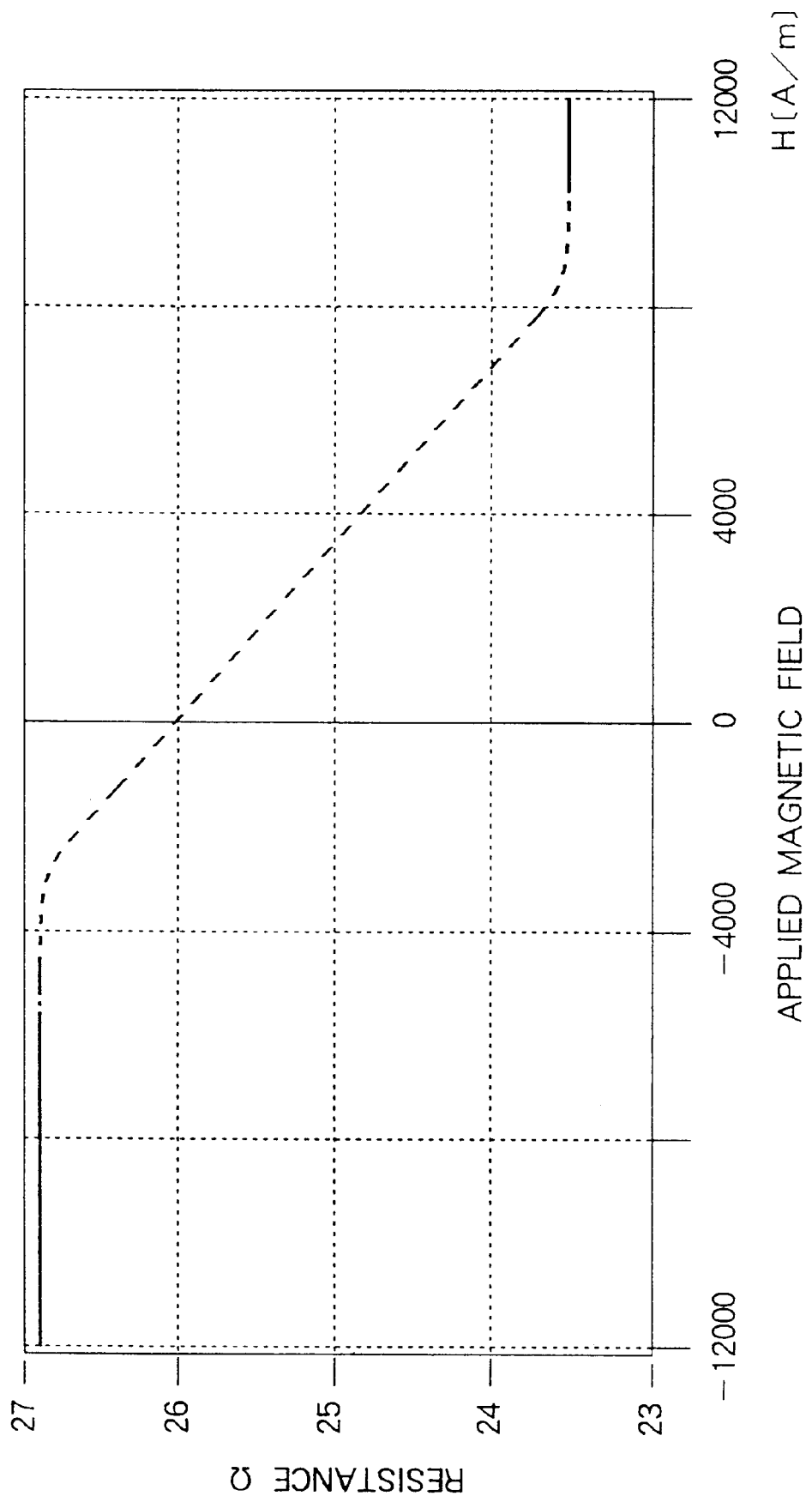
FIG. 12 is a graph showing an R-H curve of a magnetic head according to a fourth embodiment of the present invention.

FIG. 12 is a graph showing an R-H curve of the magnetic head according to the fourth embodiment. As shown in FIG. 12, the operating point shifting from the center of the R-H curve is reduced, compared to the first and second comparison examples. Thus, even if the lower magnetic layer is a laminate of a ferromagnetic layer, good results can be obtained.

In the fourth embodiment, to pin the direction of magnetization of the ferromagnetic layer, an antiferromagnetic layer is used. However, it should be noted that a high coercive force layer composed of CoPt or CoNi can be used instead of the antiferromagnetic layer. In this case, the ratio of the product ($V_{1a}$) of the thickness of the high coercive force layer and the ferromagnetic layer whose magnetization is pinned thereby and the saturated magnetization amount thereof and the product ($V_2$) of the thickness of the rotatable magnetization layer and the saturated magnetic amount thereof should be $V_2/V_{1a} \geq 3$. When the laminate film of the high coercive force layer and the ferromagnetic layer is a single high coercive force layer film, the ratio of the product ($V_{1b}$) of the thickness of the high coercive force layer and the saturated magnetization amount thereof and the product ($V_2$) of the thickness of the rotatable magnetization layer and the saturated magnetization amount should be $V_2/V_{1b} \geq 3$.

Figure 1:
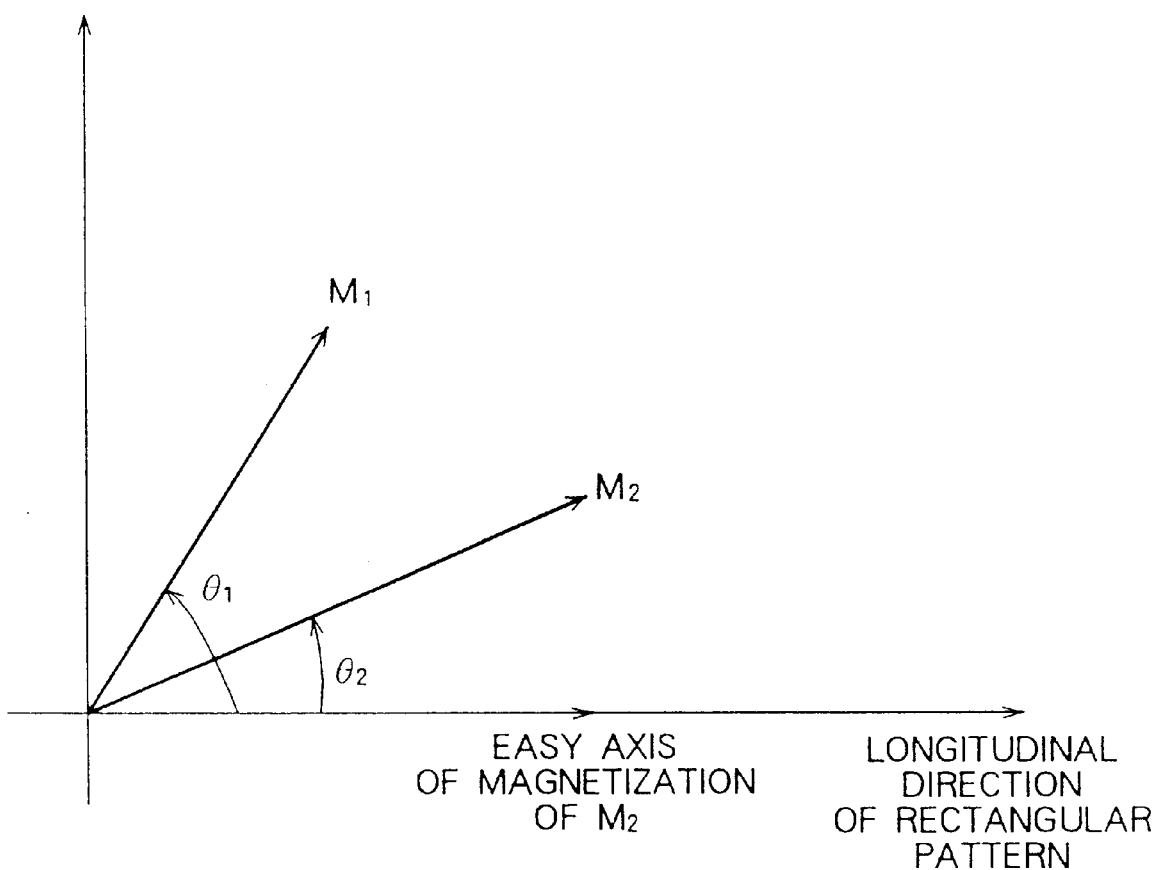
FIG. 1 is a graph for explaining the phenomenon of which the operating point is shifted in a magnetoresistive film having a rectangular pattern.
Figure 2:
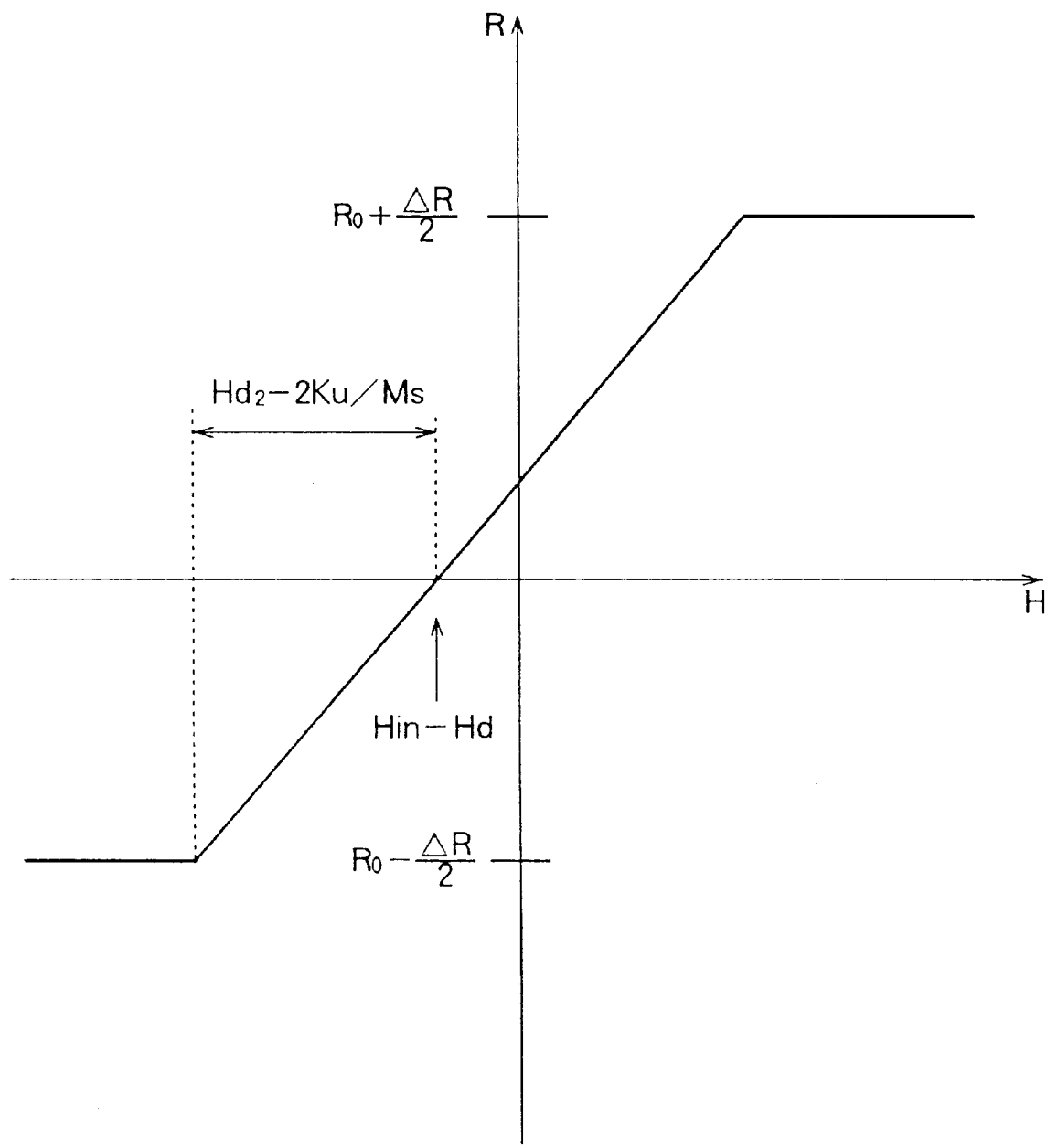
FIG. 2 is a graph showing an applied magnetic field $H_{ex}$ dependency of a resistance R of a giant magnetoresistive effect.
Figure 3:
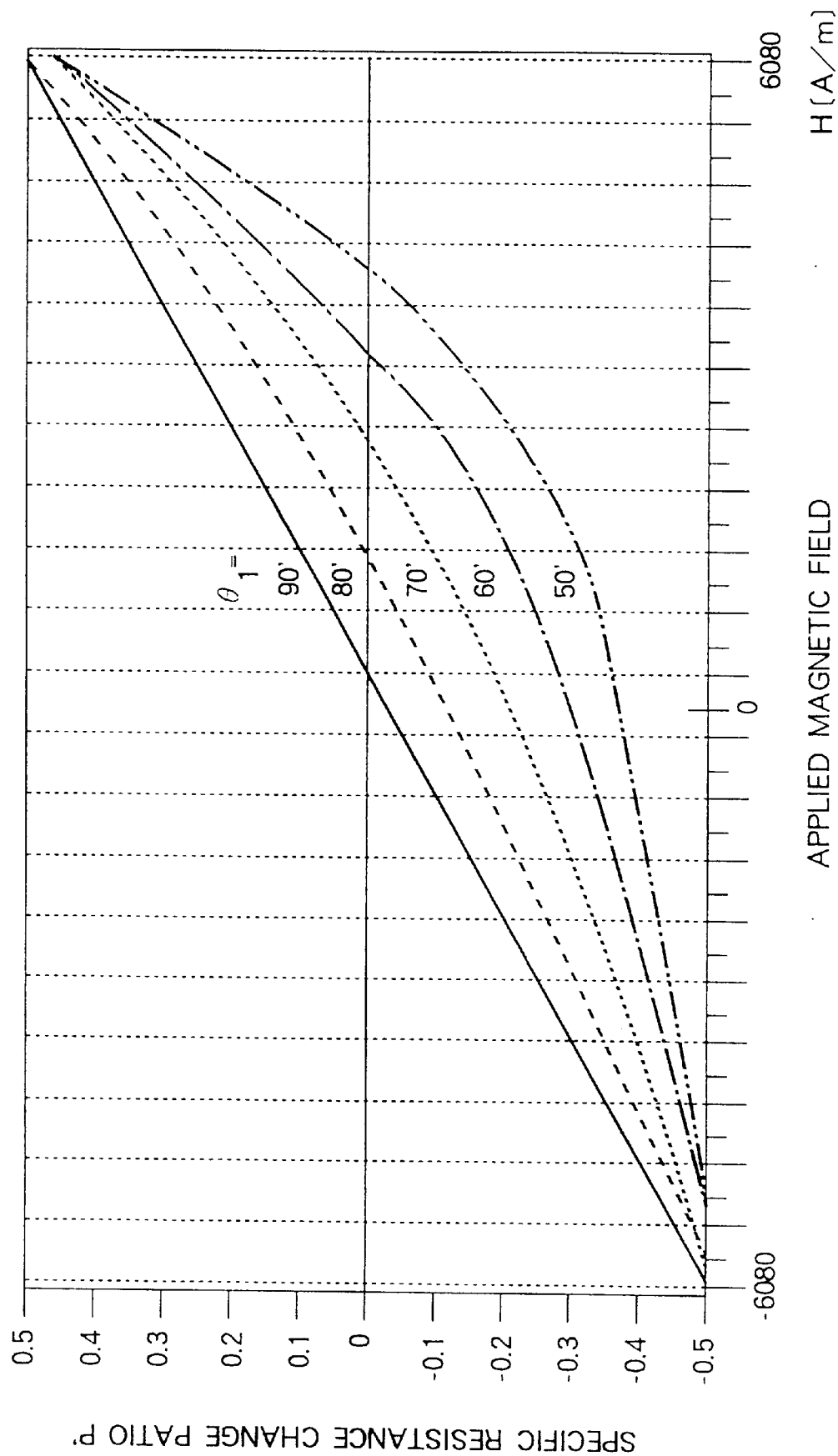
FIG. 3 is a graph showing a resistivity change ρ' by a magnetic field H with respect to the inclination of a pinned magnetization layer.

In the case that the high coercive force layer is used instead of the antiferromagnetic layer, when the direction of magnetization is inclined, the same effects as the second embodiment and the third embodiment can be obtained. However, as shown in FIG. 3, when the inclined angle becomes large, the R-H curve has a distorsion. To suppress the secondary distortion of the reproduced signal to around −20 dB, the inclined angle should be less than 30°. In other words, the relation of $60° < \theta_1 < 90°$ should be satisfied. The inclined angle can be properly designated corresponding to the relation of $V_{1a}$ and $V_2$. However, the inclined angle is preferably in the range from 1° to 25°.

Fifth Embodiment

In the fifth embodiment, the thickness of the ferromagnetic layer having the pinned magnetization layer is different from the thickness of the rotatable magnetization layer. In addition, the direction of magnetization (the direction of the easy axis of magnetization) of the rotatable magnetization layer is inclined.

Figure 13:
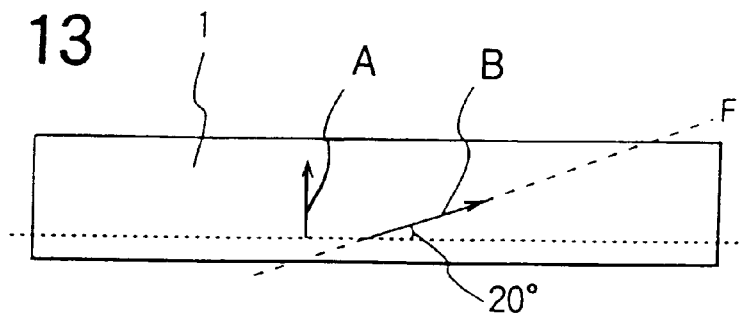
FIG. 13 is a schematic diagram showing the directions of magnetization according to a fifth embodiment of the present invention.

A magnetic head with the same construction as the first embodiment except that the direction of magnetization (the easy axis of magnetization) of the rotatable magnetization layer is inclined is obtained. The direction of magnetization (the easy axis of magnetization) of the rotatable magnetization layer can be inclined by preparing it in a bias magnetic field or by heating it at a temperature of 200 to 300° C. in a magnetic field after the element is produced. Thus, when films are prepared and/or annealed, a bias magnetic field is applied to the direction F as shown in FIG. 13, namely the 20°-inclined direction from the longitudinal direction of the spin valve element. Then, the easy axis of magnetization for the rotatable magnetization layer is formed to the direction F. (In FIG. 13, arrow A represents the direction of magnetization of the pinned layer, and arrow B represents the direction of magnetization of the free layer.). Both the upper and lower ferromagnetic layers can be prepared in the inclined bias magnetic field. Alternatively, only the lower ferromagnetic layer can be prepared in the inclined bias magnetic field.

In this construction, the shifting of the R-H curve can be reduced.

Sixth Embodiment

In the sixth embodiment, the thickness of the ferromagnetic layer having the pinned magnetization layer is different from the thickness of the rotatable magnetization layer. In addition, the direction of magnetization of a high coercive force layer for applying longitudinal bias is inclined.

A magnetic head with the same construction as the first embodiment except that the direction of magnetization of the rotatable magnetization layer is not along in the longitudinal direction of the spin valve element when a signal field is 0. After the element is produced, by applying a magnetic field from the outside to the high coercive force layer to the 20°-inclined direction from the longitudinal direction of the spin valve element, the magnetization thereof is pinned. The intensity of the magnetic field applied from the outside should be remarkably larger than the coercive force of the high coercive force layer. Since the coercive force of the high coercive force layer according to this embodiment is around 80 kA/m (1 kOe), a magnetic field with an intensity of 240 kA/m (3 kOe) is applied.

In this construction, the shifting of the R-H curve can be reduced.

Seventh Embodiment

In seventh to sixteenth embodiments and a third comparison example, a ferromagnetic layer is disposed through a non-magnetic layer.

Figure 14A:
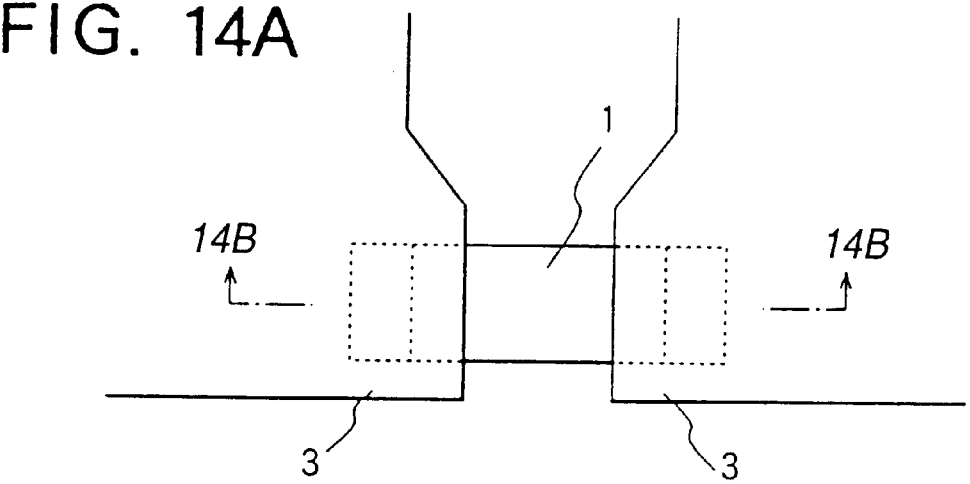
FIG. 14A is a plan view showing the construction of a magnetic head according to a seventh embodiment of the present invention.
Figure 14B:
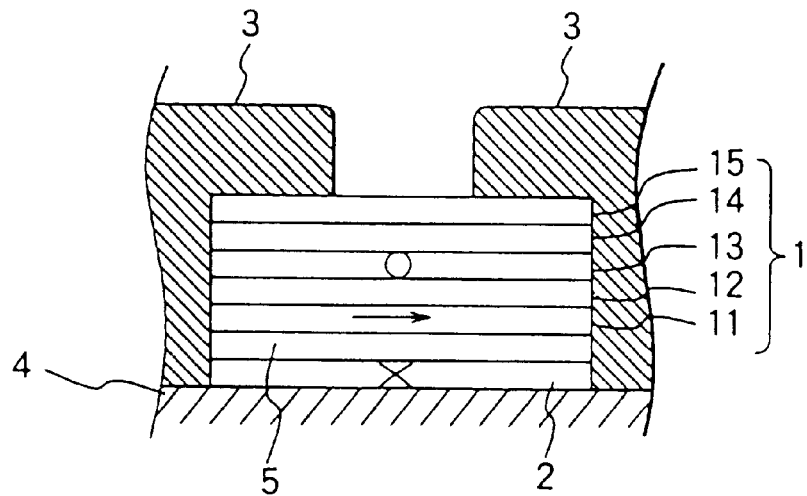
FIG. 14B is a sectional view showing the construction of the magnetic head according to the seventh embodiment of the present invention.

FIG. 14A is a plan view showing a magnetic head according to a seventh embodiment of the present invention. FIG. 14B is a sectional view taken along line 14B—14B of FIG. 14A.

A high coercive force layer (CoPt) 2 with a thickness of 5 nm and a non-magnetic layer (SiO$_2$) 5 with a thickness of 2 nm are formed on a support substrate 4. Thereafter, a spin valve laminate film 1 is formed by disposing a lower ferromagnetic layer (CoFe) 11 with a thickness of 5 nm, an intermediate layer (Cu) 12 with a thickness of 3 nm, an upper ferromagnetic layer (CoFe) 13 with a thickness of 5 nm, an antiferromagnetic layer (FeMn) 14 with a thickness of 8 nm, and a protection layer (Ti) 15 with a thickness of 10 nm in the order. The resultant laminate film is formed in a rectangular shape as shown in FIG. 14A. Leads 3 composed of Cu are formed with a thickness of around 200 nm on the resultant structure. Thus, a magnetic head is obtained. The high coercive force layer 2 and the upper ferromagnetic layer 13 that is a pinned magnetization layer are magnetized in the directions as shown in FIG. 14B. The easy axis of magnetization of the lower ferromagnetic layer 11 that is a rotatable magnetization layer is magnetized in the direction of an arrow of FIG. 14B. In FIG. 14B, symbols o, x, and → represent the directions of magnetization. The symbol o represents that the direction of magnetization is from the bottom of the drawing to the top thereof. The symbol x represents that the direction of magnetization is from the top of the drawing to the bottom thereof. The symbol → represents that the direction of magnetization is from left to right. These rules will apply to other embodiments that follow.

Figure 15:
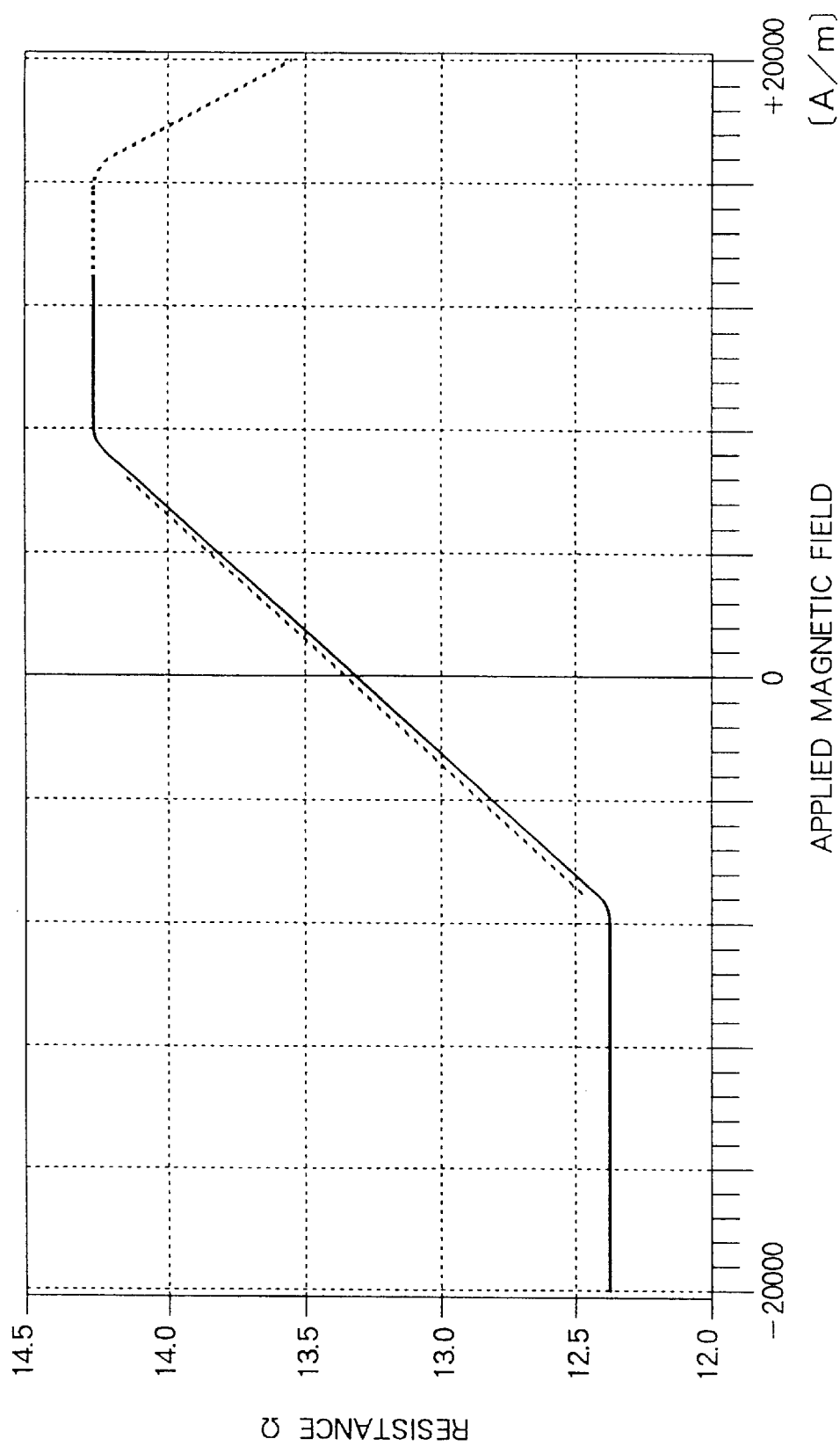
FIG. 15 is a graph showing an R-H curve of the magnetic head according to the seventh embodiment of the present invention.

FIG. 15 is a graph showing an R-H curve of the magnetic head according to the seventh embodiment. The shifting of the R-H curve of the seventh embodiment is much more reduced than that of a third comparison example (that will be described later). Thus, even if a positive signal magnetic field is applied, a resistance change that is larger than that shown in FIG. 17 can be obtained.

In the seventh embodiment, in the non-magnetic layer 5, SiO$_2$ is used. However, Al$_2$O$_3$ or the like can be used. Thus, the non-magnetic layer is preferably a non-conductive layer. When a conductor layer such as Cu is used, since the sense current shunts, the resistance change ratio decreases.

The direction of magnetization of the high coercive force layer 2 is preferably the same as the element width direction (the head depth direction) and opposite to the direction of magnetization of the pinned magnetization layer. However, the magnetization direction of the high coercive force layer 2 may have the longitudinal direction component of the element (the head track width direction).

The high coercive layer thickness of the seventh embodiment depends on the product of the saturated magnetization of the pinned magnetization layer (CoFe) and the volume thereof. When the product of the saturated magnetization of the pinned magnetization layer and the volume thereof is equal to that of the high coercive layer as with this embodiment, it is achieved that the operating point is almost at the center position {although it depends on the distance between the high coercive layer and the pinned magnetization layer (namely, the thickness of the non-magnetic layer and so forth)}. When the product of the saturated magnetization of the pinned magnetization layer and the volume thereof is larger than that of the high coersive layer, the operating point is shifted to the high resistance side. When the product of the saturated magnetization of the pinned magnetization layer and the volume thereof is smaller than that of the high coercive layer, the operating point is shifted to the low resistance side. Thus, the shifting amount of the operating point can be controlled corresponding to the saturated magnetization and the volume.

Third Comparison Example

Figure 16:
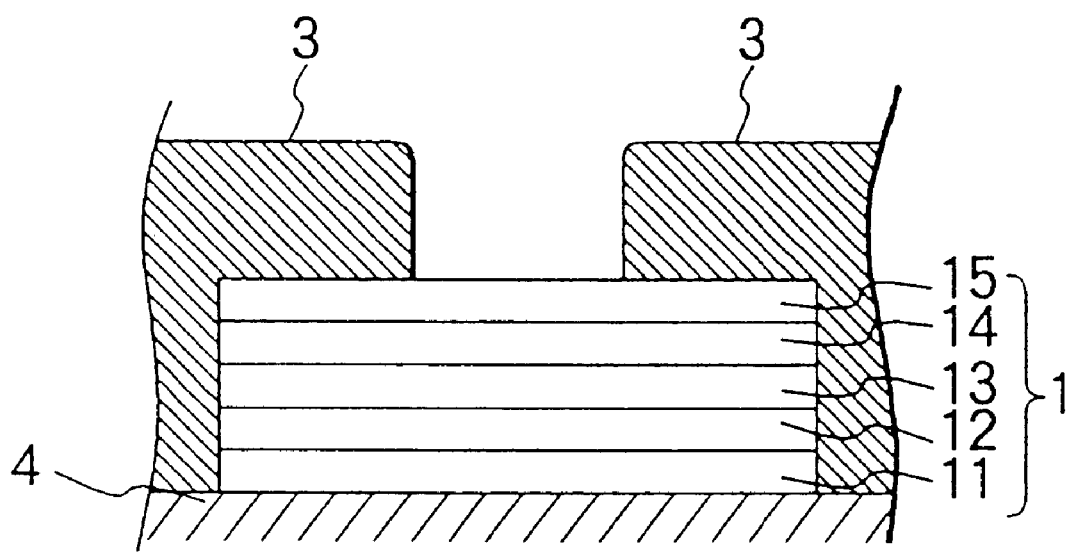
FIG. 16 is a sectional view showing a magnetic head according to a third comparison example.

A magnetic head with the same construction as the seventh embodiment except that the high coercive force layer (CoPt) and the non-magnetic layer are not formed on the support substrate 4 is obtained. FIG. 16 is a sectional view showing the magnetic head according to the third comparison example.

Figure 17:
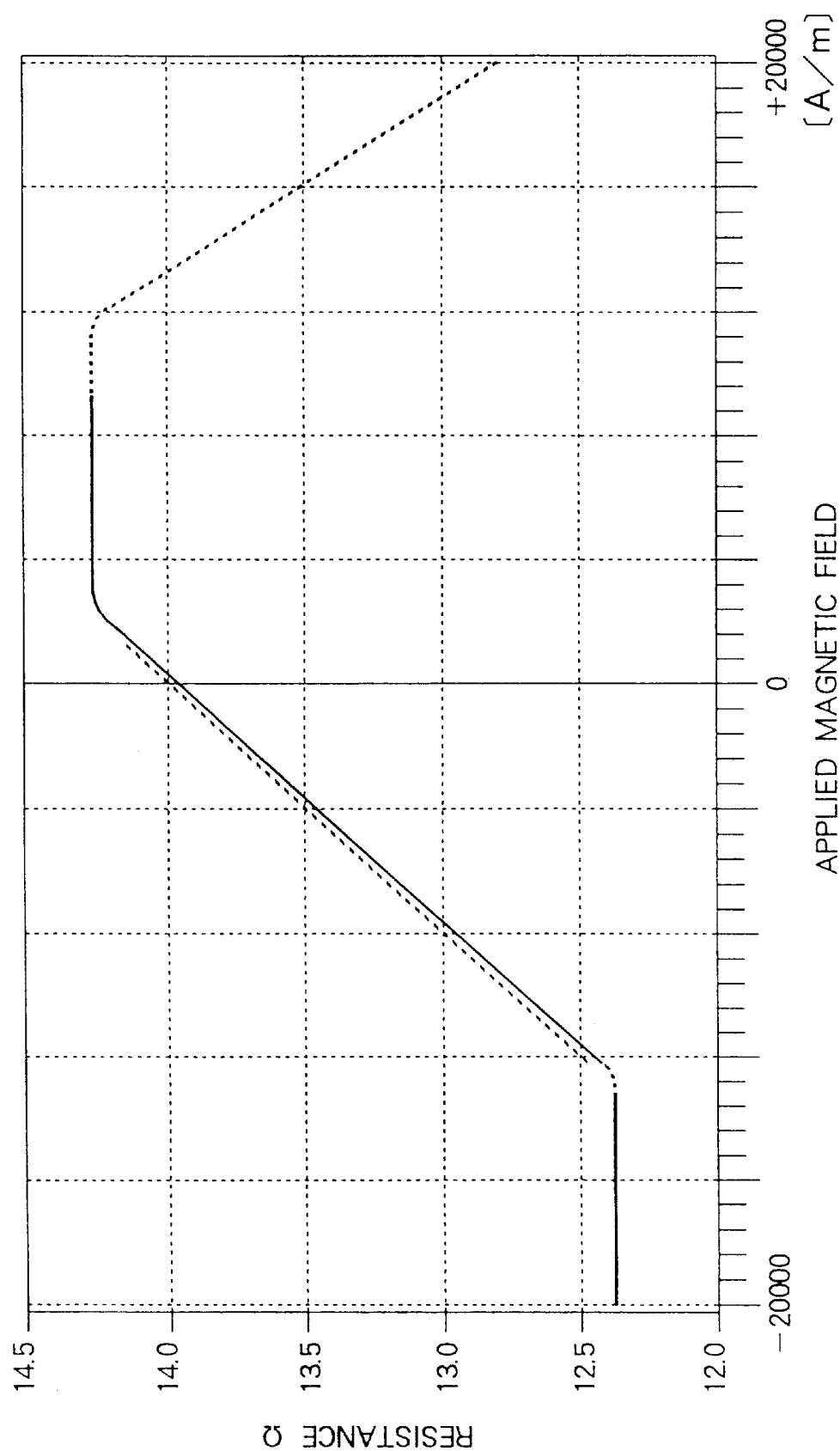
FIG. 17 is a graph showing an R-H curve of the magnetic head according to the third comparison example.

FIG. 17 is a graph showing an R-H curve of the magnetic head according to the third comparison example. As shown in FIG. 17, the R-H curve is largely shifted. When the applied magnetic field (H) is 0, the resistance increases (namely, the direction of magnetization is along opposite to and in parallel. Since the magnetic field is a signal magnetic field of the medium, when a positive signal magnetic field is applied, the resistance almost does not change.

Eighth Embodiment

A magnetic head with the same construction as the seventh embodiment except that the thickness of the high coercive force layer (CoPt) 2 is 2.5 nm is obtained.

Figure 18:
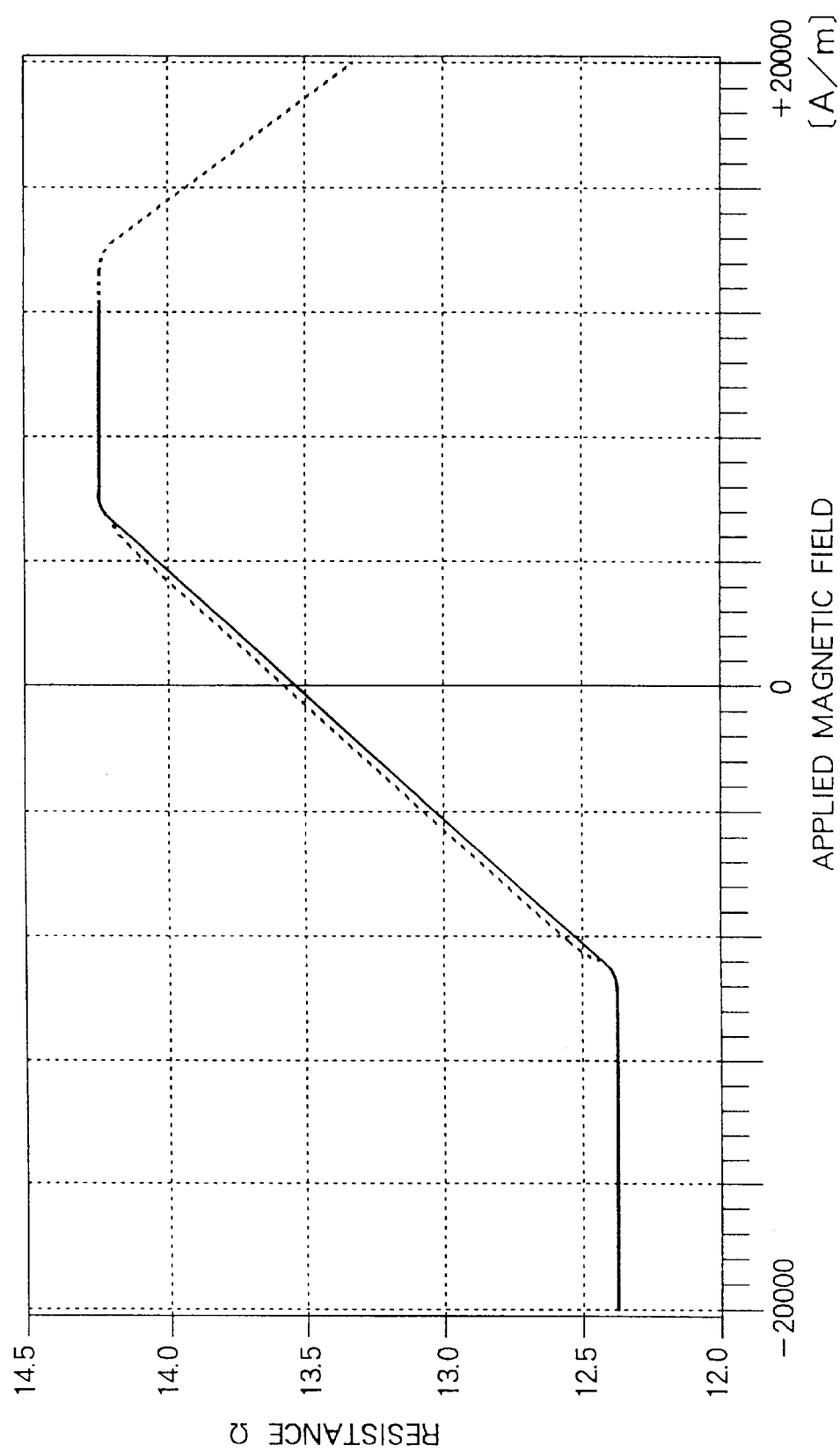
FIG. 18 is a graph showing an R-H curve of a magnetic head according to an eighth embodiment of the present invention.

FIG. 18 is a graph showing an R-H curve of the magnetic head according to the eighth embodiment. As shown in FIG. 18, the R-H curve is slightly shifted to the high resistance side. However, the shifting amount of the R-H curve is reduced.

Ninth Embodiment

A magnetic head with the same construction as the seventh embodiment except that the thickness of the high coercive force layer (CoPt) 2 is 10 nm is obtained.

Figure 19:
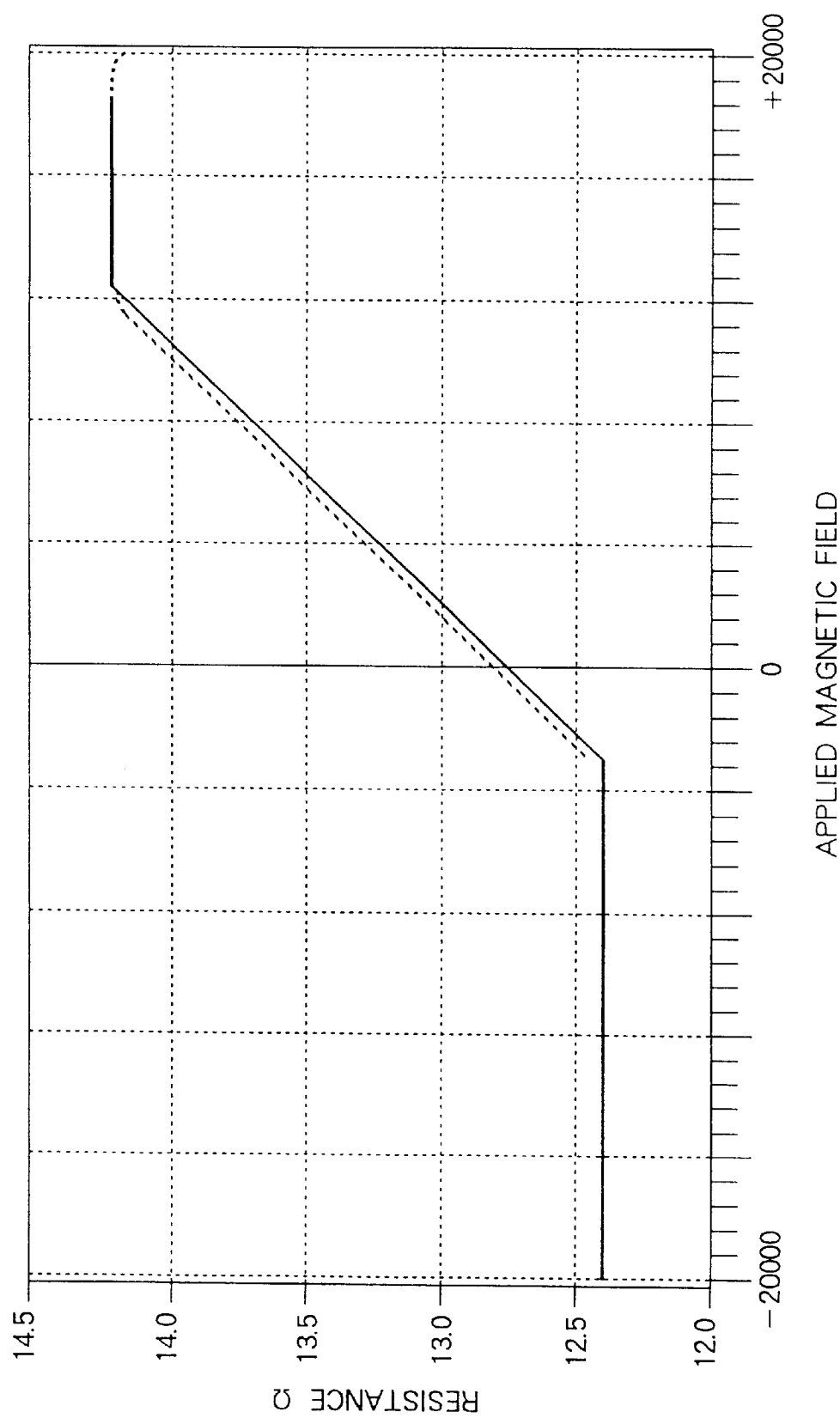
FIG. 19 is a graph showing an R-H curve of a magnetic head according to a ninth embodiment of the present invention.

FIG. 19 is a graph showing an R-H curve of the magnetic head according to the ninth embodiment. As shown in FIG. 19, the R-H curve is shifted on the low resistance side.

Tenth Embodiment

Figure 20:
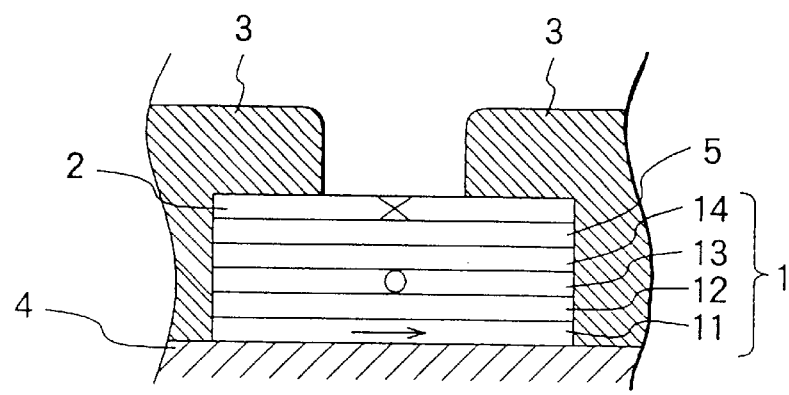
FIG. 20 is a sectional view showing a magnetic head according to a tenth embodiment of the present invention.

A spin valve laminate film 1 is formed on a support substrate 4. A non-magnetic layer 5 ($SiO_2$ or TiIV) with a thickness of 2 nm is formed on the resultant structure. Thereafter, a high coercive force layer (CoPt) 2 with a thickness of 5 nm is formed on the resultant structure. The construction of the spin valve laminate film 1 is the same as that of the seventh embodiment except that the protection layer 15 is omitted. The laminate film 1 is formed in the same rectangular shape as the seventh embodiment. Leads 3 composed of Cu are formed with a thickness of around 200 nm on the resultant structure. Thus, a magnetic head is obtained. FIG. 20 is a sectional view showing the magnetic head according to the tenth embodiment. The high coercive force layer 2, the upper ferromagnetic layer 13, and the lower ferromagnetic layer 11 are magnetized in the directions shown in FIG. 20.

The R-H curve of the magnetic head according to the tenth embodiment is the same as that shown in FIG. 15. Thus, even if a positive signal magnetic field is applied, the resistance satisfactorily changes. The direction of magnetization of the high coercive force layer 2 is preferably the same as the element width direction (the head depth direction) and opposite to the direction of magnetization of the pinned magnetization layer. However, the direction of magnetization of the high coercive force layer 2 may have the longitudinal direction component of the element (the direction of the head track width).

Eleventh Embodiment

Figure 21:
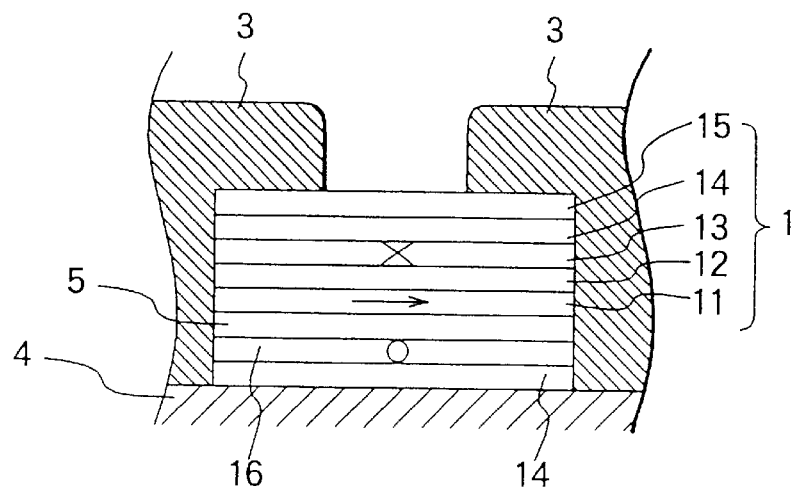
FIG. 21 is a sectional view showing a magnetic head according to an eleventh embodiment of the present invention.

An antiferromagnetic layer (FeMn) 14 with a thickness of 8 nm, a ferromagnetic layer (NiFe) 16 with a thickness of 8 nm, and a non-magnetic layer ($SiO_2$) 5 with a thickness of 2 nm are formed on a support substrate 4 in the order. Thereafter, a spin valve laminate film 1 is formed on the resultant structure. The construction of the spin valve laminate film 1 is the same as that of the seventh embodiment. The laminate film 1 is formed in the same rectangular shape as the seventh embodiment. Leads 3 composed of Cu are formed with a thickness of around 200 nm on the resultant structure. Thus, a magnetic head is obtained. FIG. 21 is a sectional view showing the magnetic head according to the eleventh embodiment. The ferromagnetic layer 16, the upper ferromagnetic layer 13, and the lower ferromagnetic layer 11 are magnetized in the directions as shown in FIG. 21.

The R-H curve of the magnetic head according to the eleventh embodiment is almost the same as that shown in FIG. 15. Thus, even if a positive signal magnetic field is applied, the resistance satisfactorily changes.

The directions of magnetization of the two ferromagnetic layers 16 and 13 are preferably opposite to and in parallel with the element width direction (the head depth direction).

Depending on whether or not the ferromagnetic layer pinned by the antiferromagnetic layer is NiFe or CoFe, the blocking temperature varies (the CoFe/FeMn has the higher blocking temperature). Therefore, when CoFe/FeMn is pinned at a high temperature annealing in a magnetic field while NiFe/FeMn is pinned at a low temperature annealing in a opposite magnetic field. The direction of pinned magnetizations of the two layers is opposite. Since the product of the saturated magnetization of the high coercive layer (NiFe/FeMn) and the pinned magnetization layer (CoFe/FeMn) and the volume thereof has the relation as described in the seventh embodiment, the shifting amount of the operating point can be controlled corresponding to the saturated magnetization and the volume.

Twelfth Embodiment

Figure 22:
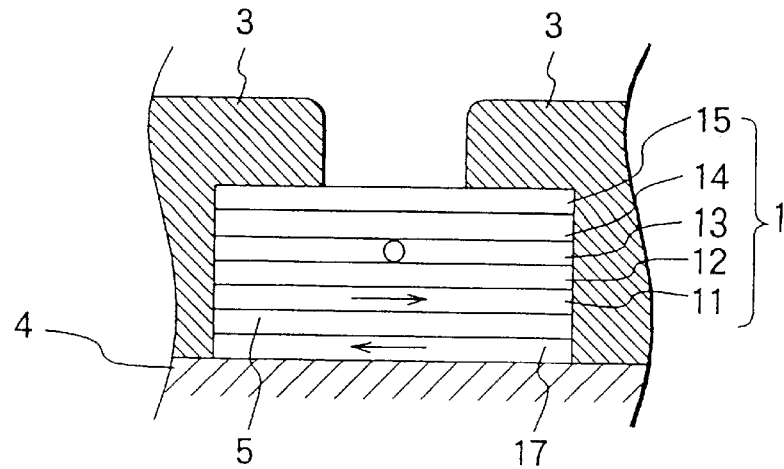
FIG. 22 is a sectional view showing a magnetic head according to a twelfth embodiment of the present invention.

A CoZrNb layer 17 with a thickness of 5 nm and a non-magnetic layer (SiO2) 5 with a thickness of 2 nm are formed on a support substrate 4 in the order. Thereafter, a spin valve laminate film 1 is formed on the resultant structure. The construction of the spin valve laminate film 1 is the same as that of the seventh embodiment. The laminate film 1 is formed in the same rectangular shape as the seventh embodiment. Leads 3 composed of Cu are formed with a thickness of around 200 nm on the resultant structure. Thus, a magnetic head is obtained. FIG. 22 is a sectional view showing the magnetic head according to the twelfth embodiment.

Figure 23:
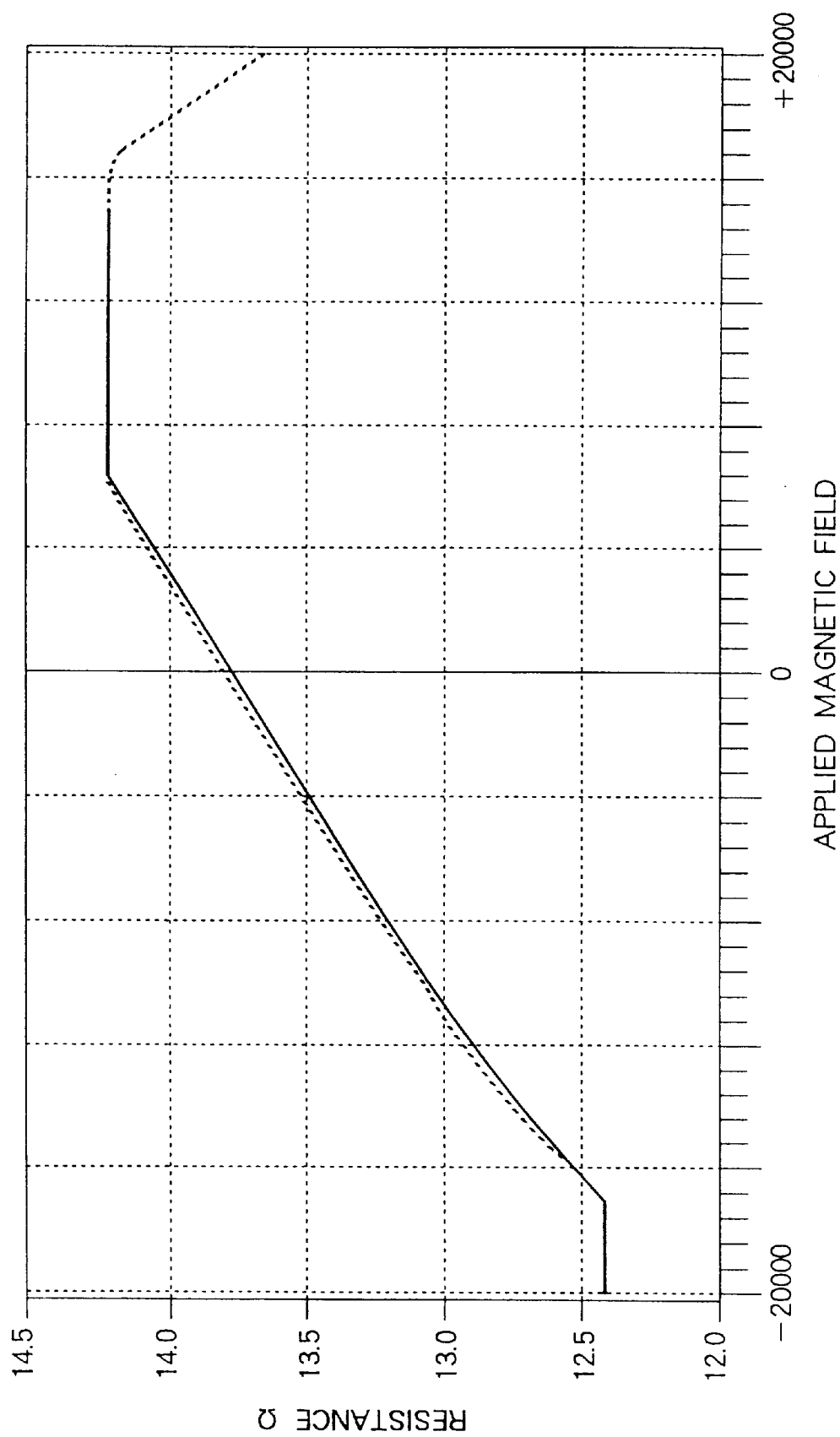
FIG. 23 is a graph Showing an R-H curve of the magnetic head according to the twelfth embodiment of the present invention.

FIG. 23 is a curve showing an The R-H curve of the magnetic head according to the twelfth embodiment. The shifting of the R-H curve of the magnetic head according to the twelfth embodiment is reduced in comparison with the R-H curve according to the third comparison example (see FIG. 17). Since the direction of magnetization of the CoZrNb layer 17 rotates toward the direction antiparallel to the direction of magnetization of the pinned magnetization layer, the leakage magnetic field of the pinned magnetization layer is hardly applied to the rotatable magnetization layer. Thus, even if a positive magnetic field is applied, the resistance remarkably changes in comparison with the third comparison example shown in FIG. 17. The the easy axis of magnetization of the CoZrNb layer may be along in the element width direction (the head depth direction). Alternatively, the easy axis of magnetization of the CoZrNb layer may be along in the longitudinal direction of the element (the head track width direction).

Thirteenth Embodiment

Figure 24:
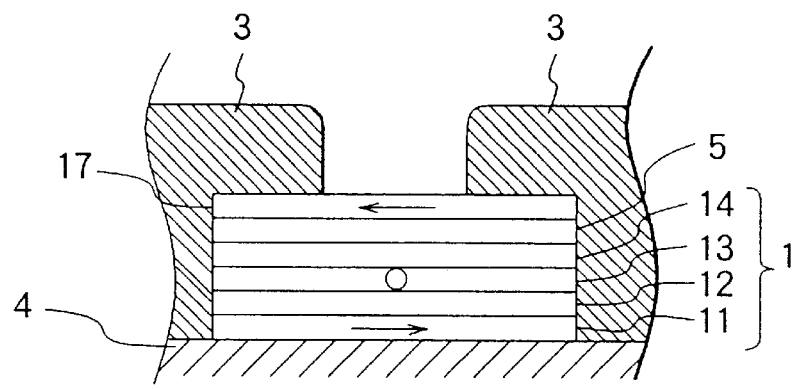
FIG. 24 is a sectional view showing a magnetic head according to a thirteenth embodiment of the present invention.

A spin valve laminate film 1 is formed on a support substrate 4. A non-magnetic layer ($SiO_2$ or TiN) 5 with a thickness of 2 nm and a CoZrNb layer 17 with a thickness of 5 nm are formed on the resultant structure in the order. The construction of the spin valve laminate film 1 is the same as that of the seventh embodiment except that a protection layer 15 is not formed. The laminate film 1 is formed in the same rectangular shape as the seventh embodiment. Leads 3 composed of Cu are formed with a thickness of around 200 nm on the resultant structure. Thus, a magnetic head is obtained. FIG. 24 is a sectional view showing the magnetic head according to the thirteenth embodiment.

The R-H curve of the magnetic head according to the thirteenth embodiment is almost the same as that shown in FIG. 23. Thus, even if a positive signal magnetic field is applied, the resistance satisfactorily changes. In this case, since the antiferromagnetic layer 14 of the spin valve laminate film 1 and the CoZrNb layer 17 are not magnetically coupled, the similar characteristic is obtained by the magnetic head with the same construction except that the non-magnetic layer 5 is omitted.

Fourteenth Embodiment

Figure 25:
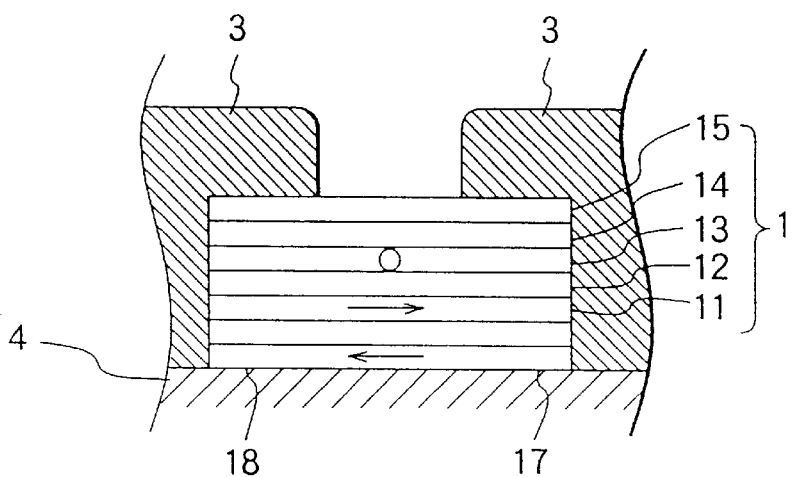
FIG. 25 is a sectional view showing a magnetic head according to a fourteenth embodiment of the present invention.

A CoZrNb layer 17 with a thickness of 10 nm is formed on a base substrate 4. A heat process is performed for the resultant structure at a temperature of 200° C. in an atmospheric gas of oxygen of 20%. Thus, an oxide layer 18 with a thickness of around 5 nm is formed on the front surface of the CoZrNb layer. Thereafter, a spin valve laminate film 1 with the same construction as the seventh embodiment is formed on the resultant structure. The laminate film 1 is formed in the same rectangular shape as the seventh embodiment. Leads 3 composed of Cu are formed with a thickness of around 200 nm on the resultant structure. FIG. 25 is a sectional view showing the magnetic head according to the fourteenth embodiment of the present invention. The CoZrNb layer 17, the upper ferromagnetic layer 13, and the lower ferromagnetic layer 11 are magnetized in the directions shown in FIG. 25.

The R-H curve of the magnetic head according to the fourteenth embodiment is almost the same as that shown in FIG. 23. Thus, even if a positive signal magnetic field is applied, the resistance satisfactorily changes.

Fifteenth Embodiment

Figure 26:
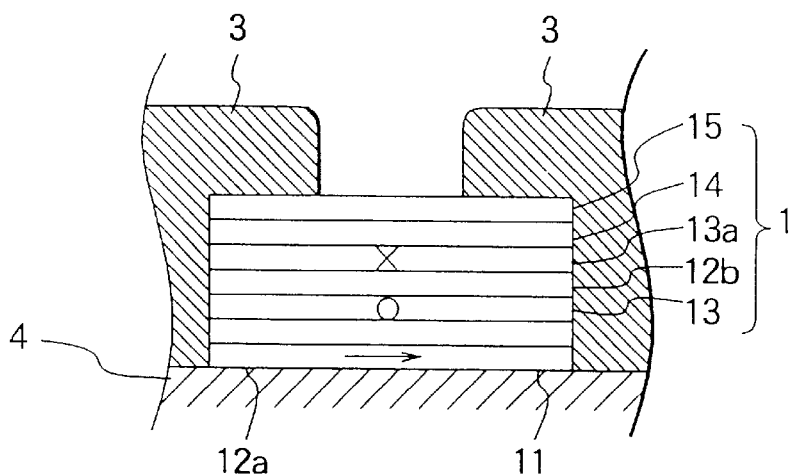
FIG. 26 is a sectional view showing a magnetic head according to a fifteenth embodiment of the present invention.

A lower ferromagnetic layer (CoFe) 11 with a thickness of 5 nm, an intermediate layer (Cu) 12$a$ with a thickness of 3 nm, an upper ferromagnetic layer (CoFe) 13 with a thickness of 5 nm, an intermediate layer (Cu) 12$b$ with a thickness of 1 nm, a ferromagnetic layer (CoFe) 13$a$ with a thickness of 5 nm, and an antiferromagnetic layer (FeMn) 14 with a thickness of 8 nm are formed on a support substrate 4 in the order. Thereafter, a protection layer (Ti) is formed on the resultant structure. The resultant laminate film is formed in the same rectangular shape as the seventh embodiment. Leads 3 composed of Cu are formed with a thickness of around 200 nm on the resultant structure. Thus, a magnetic head is obtained. FIG. 26 is a sectional view showing the magnetic head according to the fifteenth embodiment. The lower ferromagnetic layer 11, the upper ferromagnetic layer 13, and the ferromagnetic layer 13$a$ are magnetized in the directions shown in FIG. 26.

The R-H curve of the magnetic head according to the fifteenth embodiment is almost the same as that shown in FIG. 15. Thus, even if a positive signal magnetic field is applied, the resistance satisfactorily changes.

In the fifteenth embodiment, the lower ferromagnetic layer 11 is driven corresponding to a signal magnetic field. In addition, the upper ferromagnetic layers 13 and 13$a$ are antiferromagnetically coupled each other. The antiferromagnetic coupling is used in an artificial lattice of the related art reference. Thus, the antiferromagnetic coupling depends on the thickness of the intermediate layer (Cu) 12$b$.

In the fifteenth embodiment, the spin valve film is constructed of FeMn/CoFe/Cu/CoFe. However, when the antiferromagnetic layer is not used, the construction of the present invention can be applied for a giant magnetoresistance layer having two or more ferromagnetic layers with different coercive forces such as Co/Cu/NiFe. When an antiferromagnetic layer is used, as long as the construction of antiferromagnetic layer/ferromagnetic layer/non-magnetic conductor layer/ferromagnetic layer such as FeMn/NiFe/Cu/NiFe as well as FeMn/CoFe/Cu/CoFe is used, the construction of the present invention can be used regardless of the materials. When the antiferromagnetic layer is not used, as long as the construction of high coercive force layer/non-magnetic conductor layer/soft magnetic layer is used, the construction of the present invention can be used regardless of the material.

Sixteenth Embodiment

A magnetic head with the same construction as the seventh embodiment except that the direction of magnetization of the antiferromagnetic layer (FeMn) 14 is inclined to the direction of magnetization of the lower ferromagnetic layer (CoFe) 11 for 20° is obtained.

The R-H curve of the magnetic head according to the sixteenth embodiment is almost the same as that shown in FIG. 15. The shifting amount of the R-H curve is remarkably reduced. Thus, even if a positive signal magnetic field is applied, the resistance satisfactorily changes.

Seventeenth Embodiment

Figure 27:
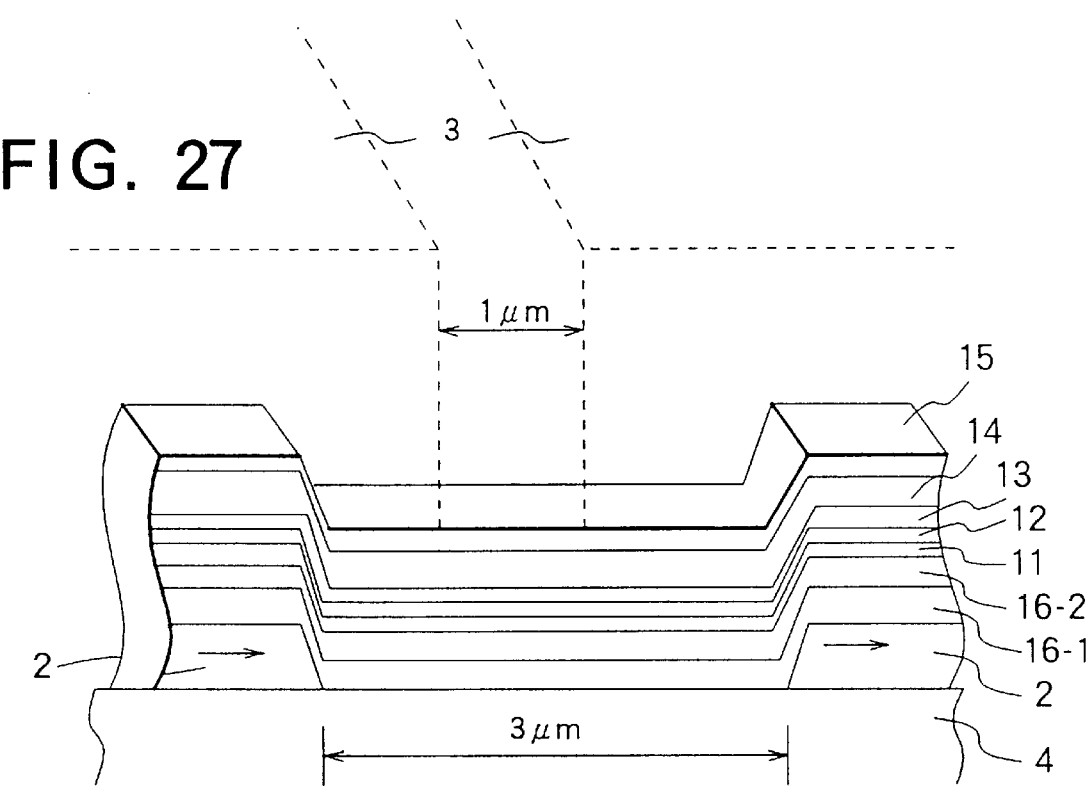
FIG. 27 is a perspective view showing an outlined construction of a magnetic head having a spin valve element according to a seventeenth embodiment of the present invention.

As shown in FIG. 27, a CoPt high coercive force film 2 (with a thickness of 20 nm) for a longitudinal bias is sputter deposited on a plastic substrate 4 and a pair of patterns are formed by an ion milling process (with a distance of 3 $\mu$m and an area of 3 $\mu$m×40 $\mu$m of which the longitudinal direction is the same as the track width direction).

Thereafter, a first magnetic underlayer film 16-1 (a CoZrNb amorphous film with a thickness of 4 nm), a second magnetic underlayer film 16-2 (a $Ni_{80}Fe_{20}$ film containing Cr of 5 atomic % with a thickness of 4 nm), a rotatable magnetization film 11 (a $Co_{90}Fe_{10}$ film with a thickness of 3 nm), a non-magnetic film 12 (a Cu film with a thickness of 3 nm), a pinned magnetization film 13 (a $Co_{90}Fe_{10}$ film with a thickness of 2.5 nm), an antiferromagnetic bias film 14 (an $Ir_{25}Mn_{75}$ film with a thickness of 10 nm) for pinning the direction of magnetization, and a protection film 15 (a TiN film with a thickness of 20 nm) are sputter deposited in the order. The resultant structure is precisely formed in a stripe shape along the track width direction by the ion milling process (with an area of 2 $\mu$m×80 $\mu$m).

Thereafter, laminate films 3 constructed of a Ta layer (with a thickness of 10 nm), a Cu layer (with a thickness of 100 nm), and a Ta layer (with a thickness of 10 nm) is sputter deposited. The resultant structure is precisely formed with a pair of leads at a distance of 1 $\mu$m (equivalent to the read track width) by the ion milling process.

Thereafter, an annealing process is performed for the resultant structure at a temperature of 250° C. for one hour in a rotating magnetic field. Next, a annealing process is performed for the spin value film in the longitudinal static magnetic field (along the stripe length) at a temperature of 250° C. for five minute. Thereafter, a annealing process is performed for the resultant structure so that the direction of the static magnetic field is rotated for 90° at a temperature of 220° C. (equivalent to the blocking temperature of the IrMn film). After the resultant structure is cooled to the room temperature, the hard magnetic film is magnetized in the longitudinal direction of the MR stripe.

Figure 28:
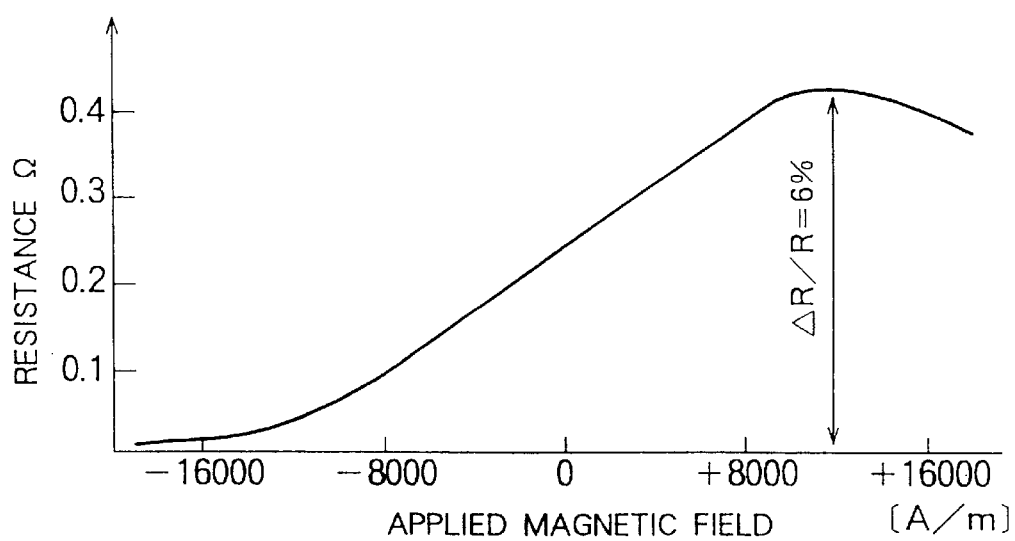
FIG. 28 is a graph showing resistance v.s. magnetic field characteristics of the spin valve element according to the seventeenth embodiment.
Figure 29:
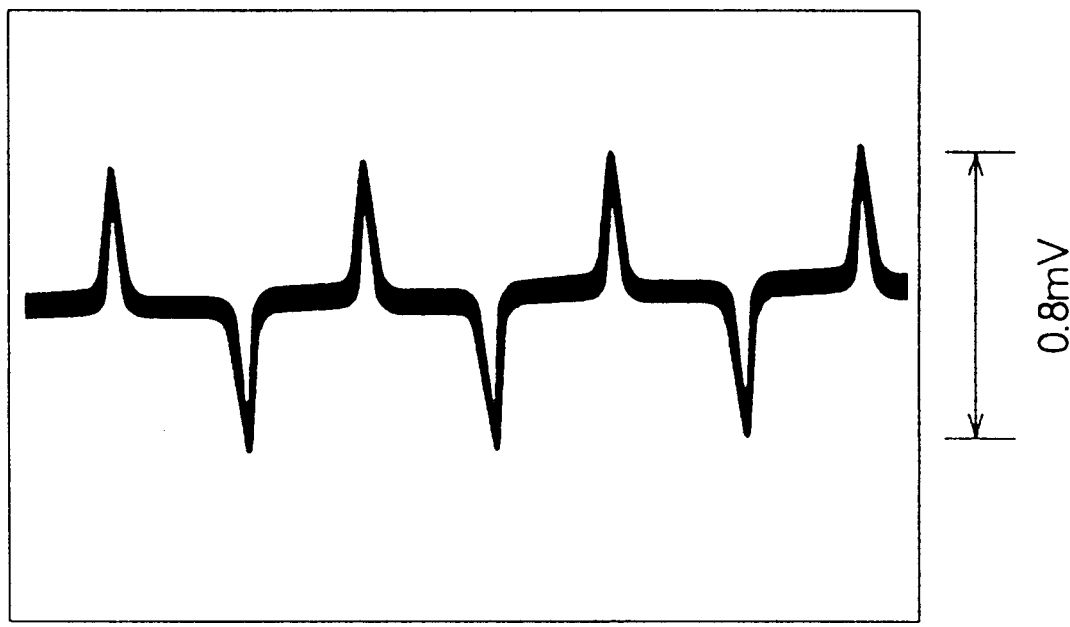
FIG. 29 is a graph showing a output waveform of the magnetic head according to the seventeenth embodiment of the present invention.

Thus, the direction of magnetization of the pinned magnetization film is almost pinned to the stripe width direction (the head depth direction) of the spin valve film to which a signal magnetic field is applied. The magnetization of the rotatable magnetic film is in the stripe longitudinal direction. FIG. 28 is a graph showing a resistance v.s. magnetic field characteristic of the spin valve element measured in the range of ±200 Oe magnetic field. In FIG. 27, a sense current of 10 mA is supplied from left to right. $\Delta R/R$ (definition: (maximum resistance−minimum resistance)/maximum resistance) is 6%. Thus, a good resistance v.s. magnetic field characteristic without hysteresis and shifting of operating point is obtained.

A shield type magnetic head having the spin valve element is produced in the following manner. Upper and lower shield films are amorphous CoZrNb films formed by a sputter process. Upper and lower gap films are laminate films composed of a Si layer (with a thickness of 10 nm), a SiOx layer (with a thickness of 10 nm), and an alumina layer (with a thickness of 50 nm). The resultant structure is fabricated in a 50% slider shape (the width of the spin valve film is 2 $\mu$m). Using a CoPt medium with Mr$\delta$=1 menu/$cm^2$ (where Mr is the residual magnetization; and $\delta$ is the thickness of the magnetic recording layer) at Hc=2500 Oe, the recording/reproducing characteristics of the medium are measured at a flying height of 40 nm. Signals are recorded by an MIG head having a FeTaN film with a saturated magnetic flux density of 1.6 T.

Figure 30:
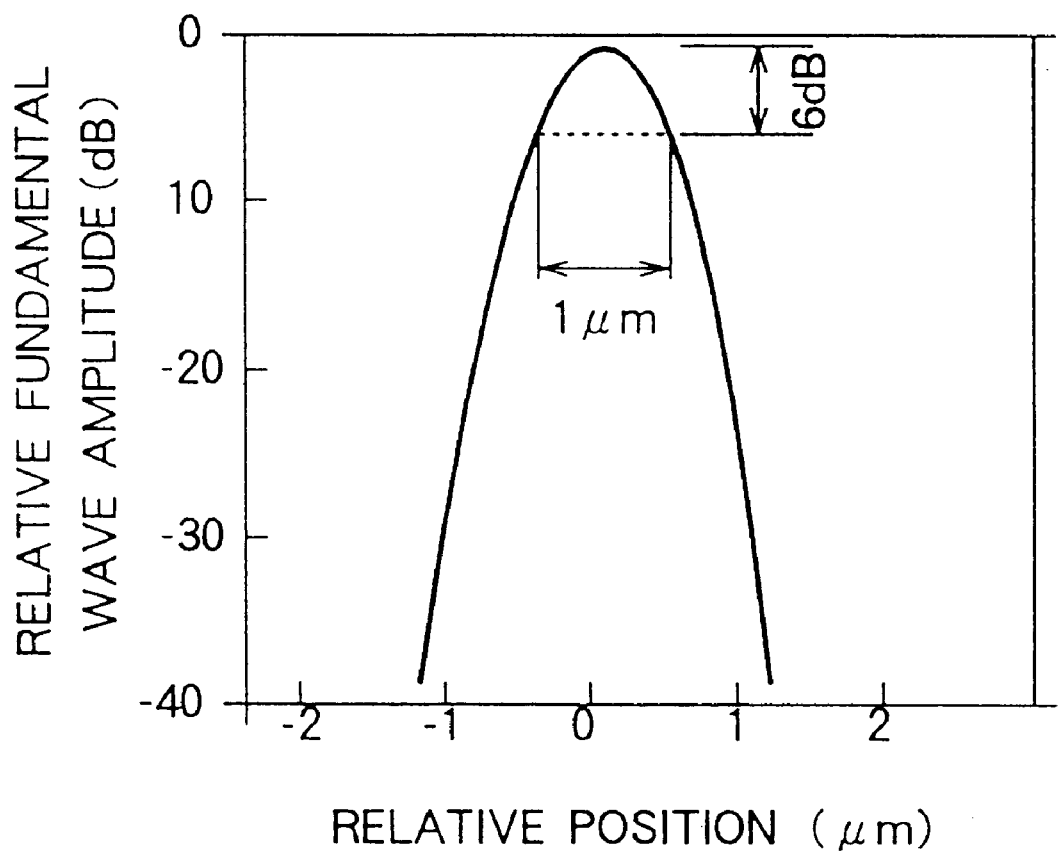
FIG. 30 is a graph showing an off-track profile of a read output of the magnetic head according to the seventeenth embodiment of the present invention.

Thus, a read waveform that is free from asymmetrical waveform and Barkhausen noise is obtained because of good linear response (with a sense current of 10 mA). In addition, a normalized output of 0.8 mVpp/$\mu$m is obtained. Moreover, a good linear recording density with $D_{50}$=150 KFCI is obtained. When a micro track of 0.5 $\mu$m is recorded on the medium, an off-track characteristic of the reproduced output is obtained as shown in FIG. 30. From FIG. 30, it is clear that a narrow track reproduction can be accomplished. In the narrow track reproduction, the effective reproduced track width of which the output level is halved (6 dB down) is almost equivalent to 1 $\mu$m that is the distance between electrodes.

Thus, when the product of the thickness of the rotatable magnetization layer and the magnetic base and the saturated magnetic field thereof is three times as large as the product of the thickness of the pinned magnetization film and the saturated magnetic field thereof, a reproducing head that has a linear response and that is free from the shifting of the operating point can be obtained. In addition, when a pair of hard magnetic film with larger distance than that of electrodes is disposed under the magnetic underlayer film with exchange coupling at an edge portion apart from the magnetic sensing portion, it is clear that a high sensible spin valve GMR head that has a narrow gap of 0.1 $\mu$m or less and a narrow track of 1 $\mu$m and that is free from a crosstalk can be accomplished.

Eighteenth Embodiment

Figure 31:
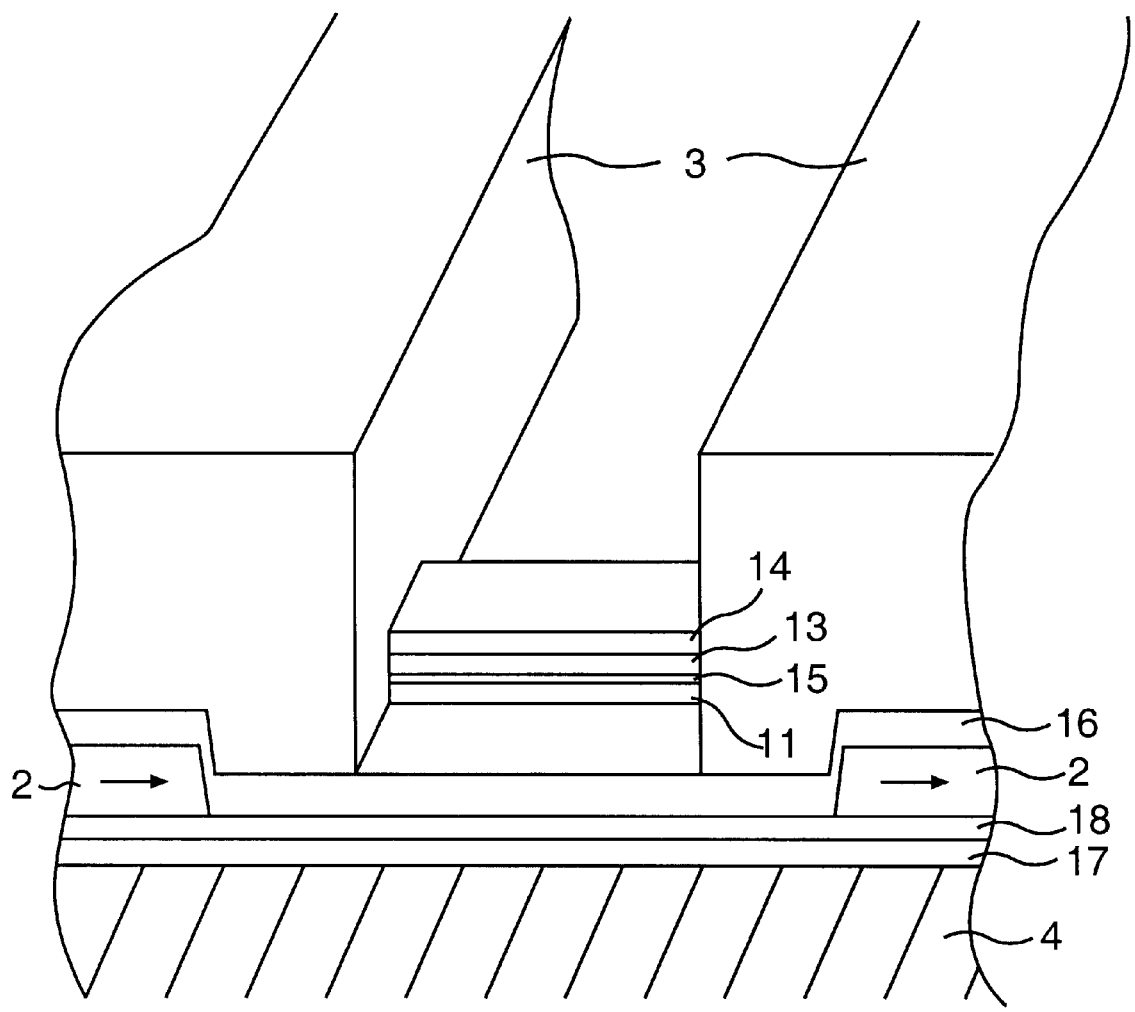
FIG. 31 is a perspective view showing the position of a spin valve element in a magnetic head according to an eighteenth embodiment of the present invention.

FIG. 31 is a perspective view showing a construction of a magnetic head of which a spin valve element is recessed from the opposite surface of a medium according to an eighteenth embodiment of the present invention. After a shield film and a gap film (not shown) are formed on a substrate 4 (if necessary), a pair of hard bias films 2, a magnetic underlayer film 16 according to the seventeenth embodiment, a spin valve element (that is a laminate film of a rotatable magnetization layer 11, a non-magnetic layer 15, a pinned magnetization layer 13, and a bias film 14 in the order) that is recessed from the opposite surface of the medium, and a pair of electrodes 3 are formed. To recess the spin valve element from the opposite surface of the medium, after the underlayer film 16 and the spin valve element are successively formed, only the spin valve element is selectively etched out by a chemical etching process. Alternatively, only the magnetic underlayer film 16 is left and a milling process is performed for the resultant structure.

The Cu film, the FeMn film, and so forth used for the non-magnetic layer 15 and the bias film 14 of the spin valve element do not have sufficient corrosive resistance. Thus, when these films are exposed to the opposite surface of the medium, the reliability of the spin valve element is deteriorated. However, according to the eighteenth embodiment of the present invention, since the spin valve element is recessed from the opposite surface of the medium, an alumina upper gap film can protect the spin valve element and thereby the reliability of the spin valve element can be secured. In addition, a rotatable magnetization layer is exchange-coupled with the magnetic underlayer film 16. Thus, even if the spin valve element is recessed from the opposite surface of the medium, since a signal magnetic field is effectively applied to the rotatable magnetization layer of the spin valve element, signals can be reproduced with a high sensitivity.

To maintain a high sensible reproduction, the recess amount of the spin valve element is preferably smaller than a characteristic length $\lambda$ of which the signal magnetic field is attenuated. The characteristic length $\lambda$ can be expressed by the following equation.

$$\lambda=(g\mu t/2)^{0.5}$$

where $\mu$ is the magnetic permeability of the magnetic underlayer film; g is the distance between the shield layer and the magnetic underlayer film; t is the thickness of the magnetic underlayer film. For example, when g is 0.1 $\mu$m, $\mu$ is 1000, and t is 10 nm, $\lambda$ is around 0.7 $\mu$m. Thus, the recess amount is preferably 0.7 $\mu$m or less. This recess amount can be obtained by a high accuracy polishing slider process.

As described above, according to the magnetic head of each aspect of the present invention, since the direction of magnetization of the pinned magnetization layer can be along almost perpendicular to the direction of magnetization of the easy axis of magnetization of the rotatable magnetization layer, the operating point can be shifted. Thus, the high resistance change ratio can be effectively used. In addition, a good linear characteristic of the signal magnetic field can be obtained. Consequently, a high frequency magnetic head with a high sensitivity can be obtained.

Moreover, when the relation of $V_2/V_1 \geq 3$ is satisfied, the operating point can be shifted.

Furthermore, when a magnetic layer is formed on the pinned magnetization layer or the rotatable magnetization layer through a non-magnetic layer, the operating point can be shifted.

Thus, the high resistance change ratio can be effectively used. In addition, since a good linear characteristic of the signal magnetic field can be obtained, a high frequency magnetic head with a high sensitivity can be obtained.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A magnetoresistive head, comprising:
   a magnetorasistive element using spin dependent scattering, said magnetoresistive element comprising:
      a rotatable magnetization film whose magnetization is rotated by a signal magnetic field, said rotatable magnetization film being formed on a ferromagnetic underlayer film, the direction of magnetization of the rotatable magnetization film being in a track width longitudinal direction when the signal magnetic field is 0,
      a pinned magnetization film whose magnetization is not substantially moved by the signal magnetic field, the direction of magnetization of said pinned magnetization film being pinned almost in the head depth direction, and
      a non-magnetic film disposed between said rotatable magnetization film and said pinned magnetization film;
   a pair of bias magnetic films disposed just below the surface of the ferromagnetic underlayer film at positions spaced apart from the portion where the magnetization is rotated by the signal magnetic field of a recording track; and
   a pair of electrodes for supplying sense current to said magnetoresistive element, wherein the relationship $(V_{21}+V_{22})/V_1>3$ is satisfied, $V_1$ being the product of the saturated magnetization of said pinned magnetization film and the volume thereof, $V_{21}$ being the product of the saturated magnetization of said rotatable magnetization film and the volume thereof, and $V_{22}$ being the product of the saturated magnetization of said ferromagnetic underlayer film and the volume thereof.

2. The magnetoresistive head as set forth in claim 1, wherein the ferromagnetic underlayer film is a laminate of a Co based amorphous alloy film and an alloy film selected from the group consisting of NiFe and NiFeX, and wherein X is at least one element selected from the group consisting of Ta, Zr, Nb, Hf, Cr, Rh, Ir, Re, Ru, Pd, Pt, Cu, Au, V, and Ag.

3. The magnetoresistive head as set forth in claim 1, wherein said rotatable magnetization film, said nonmagnetic film, and said pinned magnetization film are recessed from a surface facing a medium in comparison with said ferromagnetic underlayer film and said bias films.

4. The magnetoresistive head as set forth in claim 1, wherein each of said bias magnetic films is a hard ferromagnetic film having a magnetization which is not moved substantially by the signal magnetic field.

5. The magnetoresistive head as set forth in claim 1, wherein the distance between said pair of bias magnetic films is larger than the distance between said pair of electrodes.

* * * * *

UNITED STATES PATENT AND TRADEMARK OFFICE
CERTIFICATE OF CORRECTION

PATENT NO.: 5,991,125

DATED: November 23, 1999

INVENTOR(S): Hitoshi Iwasaki et al.

It is certified that an error appears in the above-identified patent and that said Letters Patent is hereby corrected as shown below:

Claim 1, column 21, line 1, change "$(V_{21} + V_{22})/V_1 > 3$" to --$(V_{21} + V_{22})/V_1 \geq 3$--.

Signed and Sealed this

Fifteenth Day of August, 2000

*Attest:*

Q. TODD DICKINSON

*Attesting Officer*  *Director of Patents and Trademarks*